(12) United States Patent
Ghovanloo et al.

(10) Patent No.: US 9,094,913 B2
(45) Date of Patent: Jul. 28, 2015

(54) WIDEBAND DATA AND POWER TRANSMISSION USING PULSE DELAY MODULATION

(71) Applicant: Georgia Tech Research Corporation, Atlanta, GA (US)

(72) Inventors: Maysam Ghovanloo, Atlanta, GA (US); Mehdi Kiani, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 14/082,523

(22) Filed: Nov. 18, 2013

(65) Prior Publication Data
US 2014/0140420 A1   May 22, 2014

Related U.S. Application Data

(60) Provisional application No. 61/728,259, filed on Nov. 20, 2012.

(51) Int. Cl.
H04W 52/02   (2009.01)

(52) U.S. Cl.
CPC .................. *H04W 52/0209* (2013.01)

(58) Field of Classification Search
CPC ........... A61B 2560/0219; A61B 5/0002; A61B 2560/045; A61N 1/3727; A61N 1/36175; Y10S 128/902; H04B 5/0037; H04B 5/0081; H04B 5/0031; H04B 5/02; H04B 7/1858; H04B 7/18591; H04B 14/026; H01F 38/14; H02P 6/182; H02P 6/12; H30F 2200/351; H04W 52/0209
USPC ................. 375/238, 257, 258; 607/32, 60
See application file for complete search history.

(56) References Cited

U.S. PATENT DOCUMENTS

| 4,679,560 A | 7/1987 | Galbraith |
| 4,944,299 A * | 7/1990 | Silvian ............................ 607/32 |

(Continued)

FOREIGN PATENT DOCUMENTS

| EP | 0320015 A2 | 6/1989 |
| GB | 2483847 A | 3/2012 |

OTHER PUBLICATIONS

R.A. Normann, "Technology insight: future neuroprosthetic therapies for disorders of the nervous system," Nature Clinical Practice, vol. 3, No. 8, pp. 444-452, Aug. 2007.

(Continued)

*Primary Examiner* — Vineeta Panwalkar
(74) *Attorney, Agent, or Firm* — Troutman Sanders LLP; Ryan A. Schneider; Mark L. Jones

(57) ABSTRACT

Certain implementations may include systems, methods, and apparatus for wirelessly transmitting data and power across inductive links using pulse delay modulation (PDM). According to an example implementation, a method is provided that includes generating a power carrier signal; generating a data waveform from a series of binary bits, the data waveform including a series of pulses in synchronization with the power carrier signal; transmitting, from one or more transmitting (Tx) coils of an inductive link, the power carrier signal and the data waveform; receiving, by one or more receiving (Rx) coils of the inductive link, an interference signal, the interference signal based at least in part on a superposition of the transmitted power carrier signal and the transmitted data waveform; determining zero crossings of the received interference signal; determining delays associated with the zero crossings; and determining the data packet based at least in part on the delays.

30 Claims, 22 Drawing Sheets

(56) References Cited

U.S. PATENT DOCUMENTS

| | | | |
|---|---|---|---|
| 5,828,293 | A | 10/1998 | Rickard |
| 6,047,214 | A | 4/2000 | Mueller |
| 6,091,779 | A | 7/2000 | Griessbach |
| 6,301,308 | B1 | 10/2001 | Rector |
| 6,775,324 | B1 | 8/2004 | Mohan |
| 7,042,959 | B2 | 5/2006 | Zoltowski |
| 8,023,586 | B2 | 9/2011 | Zierhofer |
| 8,155,752 | B2 | 4/2012 | Aghassian |
| 8,204,097 | B2 | 6/2012 | Oh |
| 2007/0289772 | A1 | 12/2007 | Kuroda |

OTHER PUBLICATIONS

G. M. Clark, Cochlear Implants: Fundamentals and Applications. New York: Springer-Verlag, 2003.

N. Lovell, J. Morely, S. Chen, L. Hallum, and G. Suaning, "Biological-machine systems integration: engineering the neural interface," Proc. of the IEEE, vol. 98, No. 3, pp. 418-431, Mar. 2010.

J. Fayad, S. Otto, R. Shannon, and D. Brackmann, "Cochlear and brainstem auditory prostheses, neural interface for hearing restoration: cochlear and brain stem implants," Proc. of the IEEE, vol. 96, No. 7, pp. 1085-1095, Jul. 2008.

J. Weiland and M. Humayun, "Visual prosthesis," Proc. of the IEEE, vol. 96, No. 7, pp. 1076-1084, Jul. 2008.

K. Chen, Z. Yang, L. Hoang, J. Weiland, M. Humayun, and W. Liu, "An integrated 256-channel epiretinal prosthesis," IEEE J. Solid-State Cir., vol. 45, No. 9, pp. 1946-1956, Sep. 2010.

D. B. Shire, S. K. Kelly, J. Chen, P. Doyle, M. D. Gingerich, S. F. Cogan, W. A. Drohan, O. Mendoza, L. Theogarajan, J. L. Wyatt, and J. F. Rizzo, "Development and implantation of a minimally invasive wireless subretinal neurostimulator," IEEE Trans. Biomed. Eng., vol. 56, No. 10, pp. 2502-2511, Oct. 2009.

M.S. Chae, Z. Yang, M.R. Yuce, L. Hoang, and W. Liu, "A 128-channel 6 mW wireless neural recording IC with spike feature extraction and UWB transmitter," IEEE Trans. Neural Sys. Rehab. Eng., vol. 17, No. 4, pp. 312-321, Aug. 2009.

B. Thurgood, D. Warren, N. Ledbetter, G. Clark, and R. Harrison, "A wireless integrated circuit for 100-channel charge-balanced neural stimulation," IEEE Trans. Biomed. Cir. Sys., vol. 3, No. 6, pp. 405-414, Dec. 2009.

A. Nurmikko, J. Donoghue, L. Hochberg, W. Patterson, Y. Song, C. Bull, D. Borton, F. Laiwalla, S. Park, Y. Ming, and J. Aceros, "Listening to brain microcircuits for interfacing with external world-progress in wireless implantable microelectronic neuroengineering devices," Proc. of the IEEE, vol. 98, No. 3, pp. 375-388, Mar. 2010.

S. Lee, H. Lee, M. Kiani, U. Jow, and M. Ghovanloo, "An inductively-powered scalable 32-channel wireless neural recording system-on-a-chip for neuroscience applications," IEEE Trans. Biomed. Cir. Syst., vol. 4, No. 6, pp. 360-371, Dec. 2010.

A. Sodagar, G. Perlin, Y. Yao, K. Najafi, K.D. Wise, "An implantable 64-channel wireless microsystem for single-unit neural recording," IEEE J. Solid-State Cir., vol. 44, No. 9, pp. 2591-2604, Sep. 2009.

M. Ghovanloo, "An overview of the recent wideband transcutaneous wireless communication techniques," Proc. IEEE 33rd Eng. in Med. and Biol. Conf., pp. 5864-5867, Sep. 2011.

Finkenzeller K. 2003. RFID-Handbook. 2nd Ed., Wiley, Hoboken, NJ.

A. Shameli, A. Safarian, A. Rofougaran, M. Rofougaran, J. Castaneda, and F. De Flaviis, "A UHF near-field RFID system with fully integrated transponder," IEEE Trans. Microwave Theory Tech., vol. 56, No. 5, pp. 1267-1277, May 2008.

M. Ghovanloo and K. Najafi, "A wideband frequency-shift keying wireless link for inductively powered biomedical implants," IEEE Trans. Cir. Sys. I, vol. 51, No. 12, pp. 2374-2383, Dec. 2004.

R.R. Harrison, R. Kier, C. Chestek, V. Gilja, P. Nuyujukian, S. Ryu, B. Greger, F. Solzbacher, and K. Shenoy, "Wireless neural recording with single low-power integrated circuit," IEEE Trans. Neural Syst. Rehab. Eng., vol. 17, No. 4, pp. 322-329, Aug. 2009.

Y. Hu and M. Sawan, "A fully integrated low-power BPSK demodulator for implantable medical devices," IEEE Trans. Cir. Sys. I, vol. 52, No. 12, pp. 2552-2562, Dec. 2005.

S. Mandal and R. Sarpeshkar, "Power-efficient impedance-modulation wireless data links for biomedical implants," IEEE Trans. Biomed. Cir. And Sys., vol. 2, No. 4, pp. 301-315, Dec. 2008.

A. Rush and P. Troyk, "A power and data link for a wireless-implanted neural recording system," IEEE Trans. Biomed. Cir. and Sys., vol. 59, pp. 3255-3262, Nov. 2012.

G. Simard, M. Sawan, D. Massiocotte, "High-speed OQPSK and efficient power transfer through inductive link for biomedical implants," IEEE Trans. Biomed. Cir. and Sys., vol. 4, No. 3, pp. 192-200, Jun. 2010.

M. Zhou, M. Yuce, W. and W Liu, "A non-coherent DPSK data receiver with interference cancellation for dual-band transcutaneous telemetries," IEEE J. Solid-State Cir., vol. 43, No. 9, pp. 2003-2012, Sep. 2008.

M. Ghovanloo and S. Atluri, "A wideband power-efficient inductive wireless link for implantable microelectronic devices using multiple carriers," IEEE Trans. Cir. Sys. I, vol. 54, No. 10, pp. 2211-2221, Oct. 2007.

U. Jow and M. Ghovanloo, "Optimization of data coils in a multiband wireless link for neuroprosthetic implantable devices," IEEE Trans. Biomed. Circuits Sys., vol. 4, No. 5, pp. 301-310, Oct. 2010.

G. Wang, P. Wang, Y. Tang, and W. Liu, "Analysis of dual band power and data telemetry for biomedical implants," IEEE Trans. Biomed. Cir. Syst., vol. 6, pp. 208-215, Jun. 2012.

G. Simard, M. Sawan, and D. Massicotte, "Novel coils topology intended for biomedical implants with multiple carrier inductive link," Proc. IEEE Int. Symp. Cir. Syst., pp. 537-540, May 2009.

K. Chen, Y. Lo, and W. Liu, "A 37.6mm2 1024-channel high-compliance- voltage SoC for epiretinal prostheses," Digest of technical papers IEEE Intl. Solid-State Cir. Conf., pp. 294-295, Feb. 2013.

N. Miura, D. Mizoguchi, M. Inoue, T. Sakurai, and T. Kuroda, "A 195-Gb/s 1.2-W inductive inter-chip wireless superconnect with transmitter power control scheme for 3-D-stacked system in a package", IEEE J. Solid-State Cir., vol. 41, No. 1, pp. 23-33, Jan. 2006.

S. Lee, K. Song, J. Yoo, and H. Yoo, "A low-energy inductive coupling transceiver with cm-range 50-Mbps data communication in mobile device applications," IEEE J. Solid-State Cir., vol. 45, pp. 2366-2374, Nov. 2010.

F. Inanlou and M. Ghovanloo, "Wideband near-field data transmission using pulse harmonic modulation," IEEE Trans. Cir. Sys. I, vol. 58, No. 1, pp. 186-195, Jan. 2011.

F. Inanlou, M. Kiani, and M. Ghovanloo, "A 10.2 Mbps pulse harmonic modulation based transceiver for implantable medical devices," IEEE J. Solid-State Cir., vol. 46, pp. 1296-1306, Jun. 2011.

M. Kiani and M Ghovanloo, "A 20 Mbps pulse harmonic modulation transceiver for wideband near-field data transmsson," IEEE Trans. Cir. Syst. II, IEEE Trans. on Circuits and Systems II, vol. 60, No. 7, pp. 382-386, Jul. 2013.

M. Kiani and M. Ghovanloo, "Pulse delay modulation (PDM) a new wideband data transmission method to implantable medical devices in presence of a power link," IEEE Biomed. Cir. Syst. Conf., pp. 256-259, 2012.

T. Le, J. Han, A. Jouanne, K. Marayam, and T. Fiez, "Piezoelectric micro-power generation interface circuits," IEEE J. Solid-State Cir., vol. 41, No. 6, pp. 1411-1420, Jun. 2006.

U. Jow and M. Ghovanloo, "Design and optimization of printed spiral coils for efficient transcutaneous inductive power transmission," IEEE Trans. Biomed. Cir. and Sys., vol. 1, No. 3, pp. 193-202, Sep. 2007.

S. B. Lee, M. Yin, J. R. Manns, and M. Ghovanloo, "A wideband dual-antenna receiver for wireless recording from animals behaving in large arenas," IEEE Trans. Biomed. Eng., vol. 60, pp. 1993-2004, Jul. 2013.

\* cited by examiner

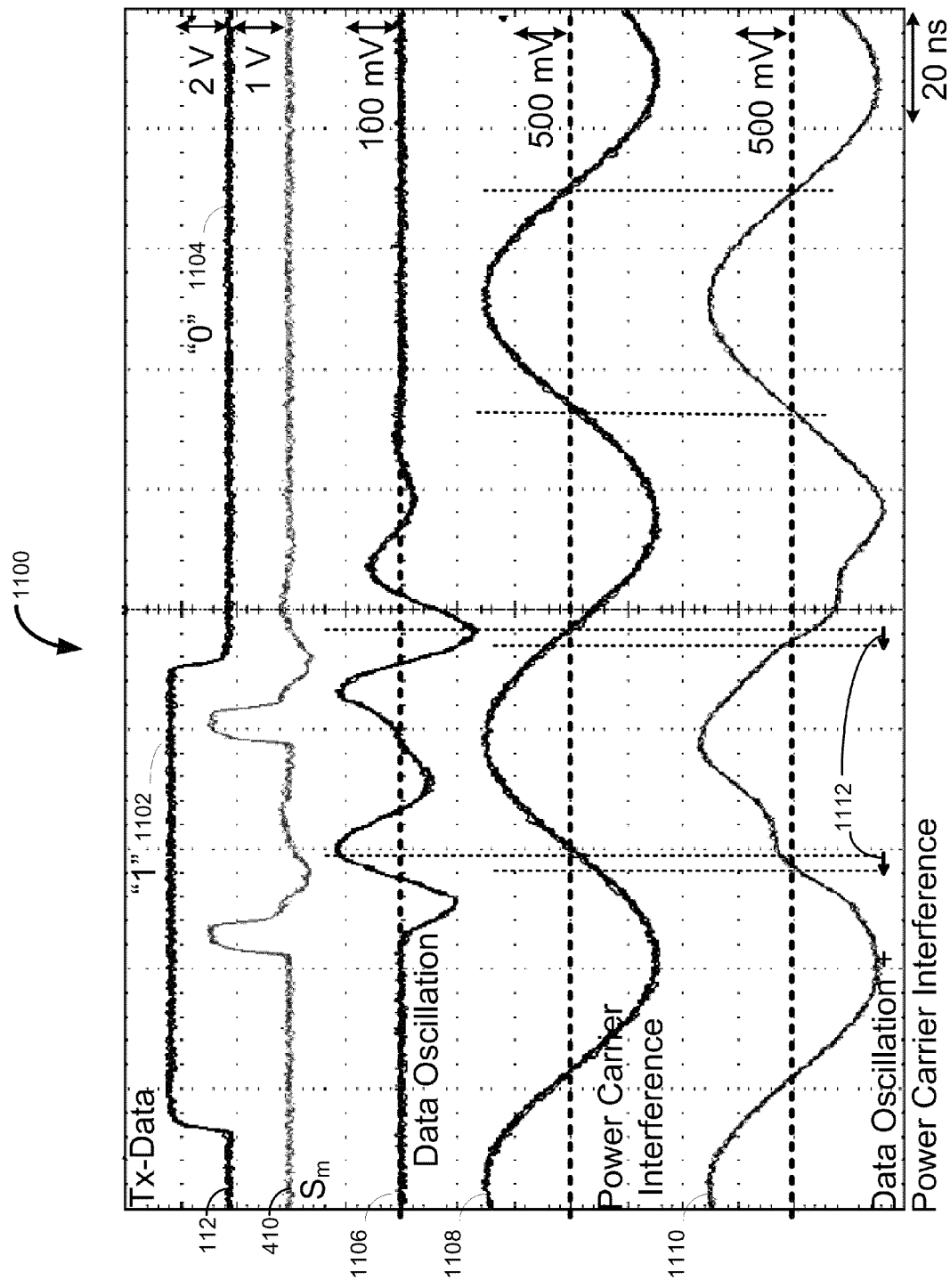

WIDEBAND DATA AND POWER TRANSMISSION USING PULSE DELAY MODULATION

RELATED APPLICATIONS

This application is related to provisional application Ser. No. 61/728,259, filed on 20 Nov. 2012, entitled: "Wideband Data and Power Transmission Using Pulse Delay Modulation," the contents of which are hereby incorporated by reference in their entirety.

STATEMENT REGARDING FEDERALLY SPONSORED RESEARCH OR DEVELOPMENT

This invention was made with Government support under the following grants: Grant Number ECCS-824199, awarded by the National Science Foundation; Grant Number 1R01NS062031, awarded by the National Institute of Neurological Diseases and Stroke (NINDS); and Grant Number 5R21EB009437, awarded by the National Institute of Biomedical Imaging and Bioengineering (NIBIB) at the National Institutes of Health. The Government has certain rights in the invention.

RELATED LITERATURE

This application is also related to the conference publication entitled: "Pulse Delay Modulation (PDM) A New Wideband Data Transmission Method to Implantable Medical Devices in Presence of a Power Link," *IEEE Biomed. Cir. Syst. Conf.*, pp. 256-259, Nov. 28-30, 2012, the contents of which are hereby incorporated by reference in their entirety.

BACKGROUND

Various versions of inductive links and associated methods have been described in the literature and utilized for wireless data and/or power transmission for use with implantable medical devices (IMDs). Well-known examples of such inductive links include those used with cochlear implants and visual prostheses, which typically involve sending a large volume of data from external artificial sensors to the IMD. The communication direction in these types of IMDs (from an external source to the implantable device) may be referred to as a "downlink." Other types of IMDs, such as invasive brain-computer interfaces (iBCI), in which large amount of information is collected from the central nervous system and sent to outside of the body for further processing may predominantly utilize the "uplink" communication direction. Most radio frequency identification (RFID) applications also utilize inductive links to energize the ultra-low power battery-less RFID tags and interrogate the tags to read their stored information.

Some of the challenges involved in designing transcutaneous data and power transmission links relate to the extremely limited space and power available to the IMD for establishing a wideband and robust connection. One goal is to achieve the highest possible data rates at the lowest possible carrier frequencies within the frequency bands of interest. However, because of the electro-magnetic field absorption in the tissue, which increases at a rate of carrier frequency squared, $f^2$, the competing goals of low carrier frequency and high data rate often rule-out a majority of established wideband wireless protocols, such as Bluetooth or WiFi, which operate at 2.4 GHz.

Certain dedicated medical communication frequency bands exist, such as the Medical Implant Communication Service (MICS), operating in the 402~405 MHz range, but typically can only provide a limited data bandwidth of approximately 300 kHz. Therefore, inductive coupling within 1-20 MHz band is the most common method that has been utilized for establishing wideband data telemetry and efficient power transmission to neuroprostheses.

The majority of modulation techniques that have been devised for near-field data transmission modify the amplitude, frequency, or phase of a sinusoidal carrier signal based on the data to be transferred across the inductive link. For example, amplitude shift-keying (ASK), frequency shift keying (FSK), load shift keying (LSK), and binary/quadrature phase shift keying (BPSK/QPSK) are examples of such conventional methods. The use of a power carrier signal along with these methods was attractive in the early IMDs because the same inductive link could be used for both power and data transmission.

In high-performance IMDs that require wider bandwidth, however, a separate power carrier from the data carrier is typically preferred because increasing the frequency of the high amplitude power carrier can lead to unsafe temperature elevation due to excessive power loss in the tissue. To achieve high power transfer efficiency (PTE) and high data rate, a high frequency carrier (>50 MHz) may be required for the data link, while it may be beneficial to keep the power carrier frequency below about 20 MHz. This has led to the use of dual-carrier power/data links with each carrier linking a separate pair of coils.

A major challenge in dual-function (power & data) inductive link designs is the cross-coupling between the two pairs of power and data coils. Part of the challenge is that to conserve space, the coils in the IMD need to be miniaturized and co-located inside the IMD. However, a strong power carrier signal can interfere with and/or dwarf the weak data signal on the receiver (Rx) side and make data recovery quite difficult, if not impossible. While certain innovative coil designs can help with reducing cross-coupling, it may still be necessary to electronically filter out the power carrier interference at the receiver (Rx) input at the cost of adding to the power consumption and complexity of the IMD. Moreover, achieving high data rates via traditional modulation schemes often requires power consuming frequency-stabilization RF circuits, such as phase-locked loops (PLL), which can add to the size, complexity and power requirements of the IMD.

SUMMARY

Some or all of the above needs may be addressed by certain implementations of the disclosed technology. According to an example implementation, a method is provided for wirelessly transmitting data and power across inductive links using pulse delay modulation (PDM). The method includes generating, based on a clock signal, a power carrier signal having a fundamental period $T_p$; receiving a data packet comprised of a series of binary bits including Ones bits and Zeros bits; generating a data waveform from the series of binary bits, the data waveform comprising a series of pulses in synchronization with the power carrier signal, the series of pulses comprising at least one pulse for each of the Ones bits or for each of the Zeros bits; transmitting, from one or more transmitting (Tx) coils of an inductive link, the power carrier signal and the data waveform; receiving, by one or more receiving (Rx) coils of the inductive link, an interference signal, the interference signal based at least in part on a superposition of the transmitted power carrier signal and the transmitted data waveform; determining zero crossings of the received interference signal; determining delays associated with the zero crossings; and determining the data packet based at least in part on the delays.

According to another example implementation, a system is provided. The system includes a plurality of coupled coils including: a power transmission (Tx) coil; a power receiver (Rx) coil, a data Tx coil; and a data Rx coil. The power Tx coil is inductively coupled with the data Rx coil in part due to proximity. The system further includes a data pulse pattern generator configured to drive the data Tx coil; a power carrier signal generator configured to drive the power Tx coil; a power receiver and clock recovery circuit operatively couple to the power Rx coil; and a pulse delay detector operatively coupled to the data Rx coil. The system further includes circuitry configured to: generate, by the power carrier signal generator and based on a clock signal, a power carrier signal having a fundamental period $T_p$; receive, at the data pulse pattern generator, a data packet comprising a series of binary bits including Ones bits and Zeros bits; generate, by the data pulse pattern generator, a data waveform from the series of binary bits, the data waveform comprising a series of pulses in synchronization with the power carrier signal, the series of pulses comprising at least one pulse for each of the Ones bits or for each of the Zeros bits; transmit, from the power transmission Tx coil, the power carrier signal; transmit, from the data Tx coil, the data waveform; receive, by the data Rx coil, an interference signal, the interference signal based at least in part on a superposition of the transmitted power carrier signal and the transmitted data waveform determine, by the pulse delay detector, zero crossings of the received interference signal; determine delays associated with the zero crossings; and determine the data packet based at least in part on the delays.

According to another example implementation, a transmitter apparatus is provided that includes a data transmission (Tx) coil configured for inductively coupling with a data receiver (Rx) coil; a power Tx coil inductively coupling with the data Rx coil due to their proximity with one another; a data pulse pattern generator configured to drive the data Tx coil; and a power carrier signal generator configured to drive the power Tx coil. The transmitter apparatus further comprises circuitry configured to: generate, by the power carrier signal generator and based on a clock signal, a power carrier signal having a fundamental period $T_p$; receive, at the data pulse pattern generator, a data packet comprising a series of binary bits including Ones bits and Zeros bits; generate, by the data pulse pattern generator, a data waveform from the series of binary bits, the data waveform comprising a series of pulses in synchronization with the power carrier signal, the series of pulses comprising at least one pulse for each of the Ones bits or for each of the Zeros bits, or the series of pulses comprising at least one pulse for each of the Ones bits and for each of the Zeros bits, wherein the pulses for the Ones bits and the Zeros bits are of opposite polarities; transmit, from the power transmission Tx coil, the power carrier signal; and transmit, from the data Tx coil, the data waveform. The transmitted power carrier signal and the transmitted data waveform are configured to superimpose to produce a an interference signal, the interference signal configured to be received at a receiver for determining zero crossing delays of the interference signal, and for determining the data packet based at least in part on the zero crossing delays.

According to another example implementation, receiver apparatus is provided that includes a power receiver (Rx) coil configured for inductively coupling with a power transmitter (Tx) coil; a data Rx coil inductively coupling with the a power Tx coil due to proximity with each other; a power receiver operatively couple to the power Rx coil; a clock recovery circuit operatively couple to the power Rx coil; and a pulse delay detector operatively coupled to the data Rx coil. The receiver apparatus further includes circuitry configured to: receive, by the data Rx coil, an interference signal, the interference signal based at least in part on a superposition of a transmitted power carrier signal and a transmitted data waveform; determine, by the pulse delay detector, zero crossings of the received interference signal; determine delays associated with the zero crossings; determine the data packet based at least in part on the delays; and output the data packet.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 11 shows measured transmitter waveforms for data bits "1" and "0" at 13.56 Mbps and PPG output ($S_m$ in FIG. 4), and $L_4C_4$-tank waveforms after a 20 dB amplification by a discrete RF amplifier.

DETAILED DESCRIPTION

Some implementations of the disclosed technology will be described more fully hereinafter with reference to the accompanying drawings. This disclosed technology may, however, be embodied in many different forms and should not be construed as limited to the implementations set forth herein.

Example implementations of the disclosed technology include systems, methods, and apparatus for wirelessly transmitting data and power across inductive links of a wireless transceiver (Tx-Rx) system using Pulse Delay Modulation (PDM) for near-field simultaneous data and power transmission. According to various example implementations disclosed herein, the unavoidable (and typically unwanted) crosstalk between power and data transmission is utilized to recover the data signal at the receiver (Rx). For example, and according various implementations, power and data transmission signals may be used to drive respective transmitter (Tx) coils at the transmitter side of the wireless transceiver. Corresponding power and data coils at the receiver (Rx) side of the transceiver may each receive the transmitted power and data signals, with a certain amount of crosstalk due to mutual inductive coupling, even though the coils may be configured to minimize such crosstalk.

In one example implementation, the (relatively strong) power signal may combine with the data signal at the data Rx coil, and the superposition of these two signals, may essentially "distort" the shape of the power signal such that the resulting signal has zero crossings that are modified by the data signal. In certain example implementations, the delays in the zero crossings can be detected relative to a recovered clock signal, and the data signal may be regenerated at the Rx based on the zero crossings.

Example embodiments disclosed herein may provide a more efficient power and space utilization, particular for implantable medical devices, by utilizing the power carrier interference on the Rx side, and by utilizing near-field IR-UWB, particularly on the Tx side, by eliminating the data carrier.

Figure 1:
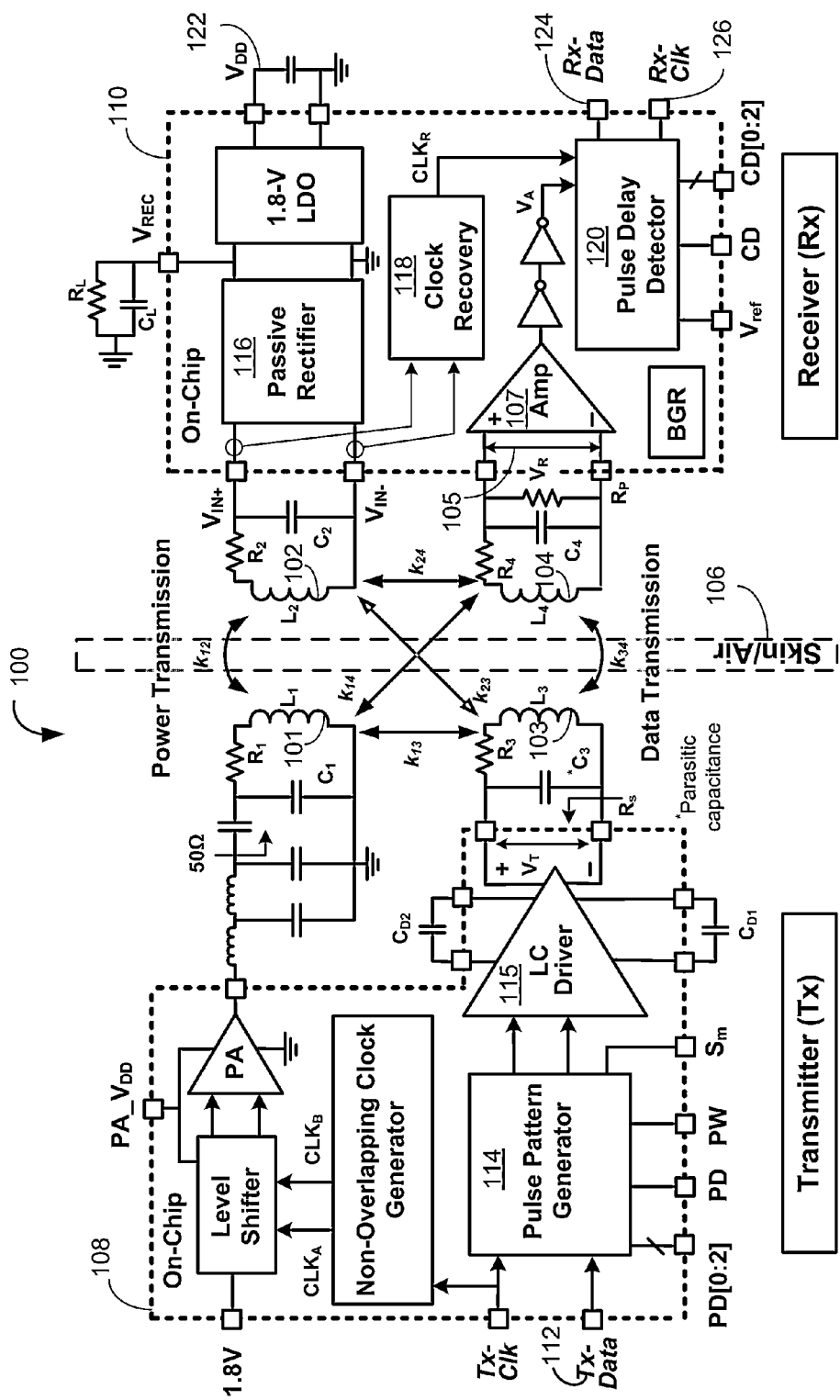
FIG. 1 is a block diagram of an illustrative wireless power and data transmission circuit across a dual-band inductive link using the Pulse Delay Modulation (PDM) scheme, according to an example implementation, with direct ($k_{12}$ and $k_{34}$) and cross ($k_{13}$, $k_{14}$, $k_{23}$, and $k_{24}$) couplings across two pairs of coils indicated.

FIG. 1 shows a block diagram of an illustrative dual-band wireless power and data transmission and receiver circuit 100 for communication across an inductive link using the Pulse Delay Modulation (PDM) scheme, according to an example implementation. In certain example implementations of the disclosed technology, a power Tx coil $L_1$ 101, a power Rx coil $L_2$ 102, a data Tx coil $L_3$ 103, and a data Rx coil $L_4$ 104 are configured for wireless communication across a region 106 that may include skin, air, tissue, etc. FIG. 1 also shows the corresponding direct ($k_{12}$ and $k_{34}$) and cross ($k_{13}$, $k_{14}$, $k_{23}$, and $k_{24}$) couplings across the two pairs of coils.

According to an example implementation, the wireless power and data transmission and receiver circuit 100 may include a transmitter (Tx) 108 portion and a receiver (Rx) 110 portion. The power and data flow is depicted as flowing from the left to right in FIG. 1, but in certain example implementations, certain Rx data circuitry (not shown) may be included in the left hand side of the figure, and Tx data circuitry (not shown) may be included in the right hand side of the figure to enable bi-directional communications.

According to an example implementation, Tx data 112 may be received as input to the Tx 108, and may be utilized to produce a pulse pattern by the pulse pattern generator 114, which may be fed to the LC (inductance/capacitance) driver 115 for driving data Tx coil $L_3$ 103. In certain example implementations, a clock signal may also be received and utilized for generating the pulse pattern, and also for generating a power transmission signal for driving the power Tx coil $L_1$ 101.

On the Rx 110 side, the data Rx coil L5 104 may receive a superposition of the transmitted data signal from data Tx coil $L_3$ 103 (via direct coupling $k_{34}$) and the transmitted power signal from the power Tx coil $L_1$ 101 (via cross coupling cross $k_{14}$). According to an example implementation, this superposition of the transmitted data signal and a transmitted power signal may be used in conjunction with clock recovery circuitry 118 and a pulse delay detector 120 to produce recovered Rx data 124 and recovered Rx clock 126 signals. According to an example implementation, a passive rectifier 116 may be utilized to rectify the received power signal, and a low-dropout regulator (LDO) may be utilized to produce DC power 122 to power circuitry on the receiver side of the link. Additional details with respect to the wireless power and data Tx 108 and Rx 110 circuit 100 will be further discussed below with reference to the figures.

Certain advantages may be realized in the disclosed systems, methods, and apparatus compared with traditional or state-of-the-art simultaneous wireless data and power transmission across an inductive link, and may include one or more of: 1) increasing data rate, 2) reducing both Tx and Rx power consumption and die area, and 3) improving robustness against power carrier interference by reducing the required SIR to achieve the same BER. The following sections of this disclosure provide a brief overview of the PDM architecture with respect to the inductive links and its theory, details about the PDM transceiver circuit, PDM transceiver characterization and measurement results.

PDM Operation

Inside the PDM Tx 108, shown in the left dashed box in FIG. 1, and according to an example implementation of the disclosed technology, a clock generator block may be utilized to create two non-overlapping clocks from an external master clock signal, Tx-Clk, at the desired carrier frequency, fp, for a class-D power amplifier (PA), which can generate the power carrier signal at a desired output power level that can be adjusted by its supply voltage, PA_VDD. The power carrier may be delivered to $L_1$ 101 after passing through a 50Ω matching circuit to induce current in $L_2$ 102. According to one example implementation, using the same Tx-Clk, a pulse pattern generator (PPG) 114 can generate one or more narrow pulses in sync with the power carrier. In one example implementation two narrow pulses may be generated and spaced by half a power carrier cycle, Tp/2, for each Tx-Data bit "1". In one example implementation no pulses are generated for Tx-Data bit "0". In certain example implementations of the disclosed technology, the LC driver circuit may be configured to transmit each pulse across $L_3$-$L_4$ data link 103 104. In certain example implementations, each data pulse may generate a decaying oscillatory response at a carrier harmonic frequency for which the $L_4$ 104 and $C_4$-tank is tuned. For example, within every data bit "1" period, oscillations from the pulses alter the timing of the power carrier interference zero-crossings across the $L_4$ 104 and $C_4$-tank, which is induced through k14 and k24 cross couplings.

According to an example implementation, and inside the Rx 110, which is the right dashed box in FIG. 1, a passive full-wave rectifier 116 may be followed by a 1.8 V low dropout (LDO) regulator to provide the IMD power supply, VDD 122. The Rx 110 also includes a clock recovery circuit 118 configured to extract the internal clock, CLKR, from the received power carrier across the $L_2$ 102 and $C_2$-tank. $V_R$ 105 may be designated as the receive input voltage signal across the $L_4$ 104 and $C_4$-tank and the superposition of the power carrier interference through k14 and k24 and PDM pulses through k34. In one example implementation, $V_R$ 105 may be amplified to create a square waveform, $V_A$, and then a pulse delay detector 120 may be utilized to integrate the time shifts between $V_A$ and CLKR to recover the received data bit stream 124.

Inductive Link Impulse Response

In the PDM data link in FIG. 1, since $k_{34}$ is relatively small, we can neglect the effect of the $L_4C_4$-tank on the $L_3C_3$-tank to simplify our equations. The pulse pattern generator 114 in FIG. 1 can be modeled by a voltage source in series with output resistance, $R_s$, driving $L_3C_3$-tank. $L_4C_4$-tank is tuned at $f_d$, while the $L_3C_3$-tank can be either tuned at $f_d$ or left at its self-resonance frequency (SRF), in which case $C_3$ in FIG. 1 represents the parasitic capacitance of $L_3$. The inductive data link transfer function in the S-domain i.e. the ratio of the voltage across the $L_4C_4$-tank, $V_R$, to the LC driver output, $V_T$, can be described as, $$H_{34}(s) = \frac{M_{34}s}{(R_sL_3C_3s^2 + (R_sR_3C_3 + L_3)s + R_s + R_3)(L_4C_4s^2 + R_4C_4s + 1)} \quad (1)$$

where all circuit parameters are the lumped elements in FIG. 1 and $M_{34}=k_{34}\times(L_3L_4)^{0.5}$ is the mutual inductance between $L_3$ and $L_4$. $H_{34}(s)$ is composed of two $2^{nd}$-order terms, one originating from the data Tx and the other from the data Rx tanks, each of which can be expressed as, $$\frac{1}{s^2 + 2\zeta\omega_n s + \omega_n^2} = \frac{1}{(s+s_1)(s+s_1^*)}, \quad (2)$$

$$s_1 = \zeta\omega_n + j\omega_d, 0 \leq \zeta < 1$$

where $\zeta$ is the damping ratio, $\omega_n$ is the natural frequency, and $\omega_d = \omega_n \times (1-\zeta^2)^{1/2}$ is the natural damping frequency of the system. From (1) and (2), these $2^{nd}$-order system parameters can be expressed in terms of the lumped circuit elements in FIG. 1, $$\zeta_1\omega_{n_1} = \frac{(R_sR_3C_3 + L_3)}{2R_sL_3C_3} \cong \frac{1}{2R_sC_3}, \quad (3)$$

$$\omega_{n_1}^2 = \frac{R_s + R_3}{R_sL_3C_3} \cong \frac{1}{L_3C_3},$$

$$\zeta_2\omega_{n_2} = \frac{R_4}{2L_4}, \quad (4)$$

$$\omega_{n_2}^2 = \frac{1}{L_4C_4}.$$

Assuming both $2^{nd}$-order systems are under damped, $\zeta_1 < 1$ and $\zeta_2 < 1$, which is often the case for LC-tanks used in data telemetry links, (1) can be rearranged as, $$H_{34}(s) = \frac{M_{34}s}{R_sL_3C_3(s+s_1)(s+s_1^*) \times L_4C_4(s+s_2)(s+s_2^*)}, \quad (5)$$

$$s_j = \zeta_j\omega_{n_j} + j\omega_{d_j},$$

$$j = 1, 2$$

and $H_{34}(s)$ may be expressed as the sum of its first order components, $$H_{34}(s) = \left[\frac{A_1}{(s+s_1)} + \frac{A_1^*}{(s+s_1^*)} + \frac{A_2}{(s+s_2)} + \frac{A_2^*}{(s+s_2^*)}\right], \quad (6)$$

where $$A_1 = \frac{-M_{34}s_1}{R_sL_3C_3(s_1^*-s_1) \times L_4C_4(s_2-s_1)(s_2^*-s_1)} \quad (7)$$

$$= a_1 + jb_1,$$

$$A_2 = \frac{-M_{34}s_2}{R_sL_3C_3(s_1-s_2)(s_1^*-s_2) \times L_4C_4(s_2^*-s_2)} \quad (8)$$

$$= a_2 + jb_2,$$

and the inverse Laplace transform may be applied to find the impulse response for the inductive link, $$h_{34}(t) = 2e^{-\zeta_1\omega_4 f p/lit}(a_1\cos(\omega_{d_1}t) + b_1\sin(\omega_{d_1}t)) + 2e^{4-26\circ}n^{2i}(a_2\cos(w_{d2}t) + b_2\sin(w_{d2}t)) \quad (9)$$

This response is an oscillation, which envelope builds up rapidly with $1/\zeta_1\omega_{n1}$ but decays slowly with $1/\zeta_2\omega_{n2}$.

The impulse response of the power interference link due to $k_{14}$, i.e. $H_{14}(s)$, can be found from (5) by substituting $L_3C_3$-tank circuits parameters and $M_{34}$ with $L_1C_1$-tank parameters and $M_{14}$, respectively. Because the voltage across $L_1$ is much larger than that of $L_2$, we can safely neglect the effect of $L_2C_2$-tank on the $L_4C_4$-tank through $k_{24}$. Therefore, the amplitude and phase of the power carrier interference across the $L_4C_4$-tank, i.e. the power carrier component of $V_R$, can be calculated using $|H_{14}(j\omega_p)|$ and $\angle H_{14}(j\omega_p)$, respectively, where $\omega_p = 2\pi f_p$.

Pulse Delay Modulation

Figure 2:
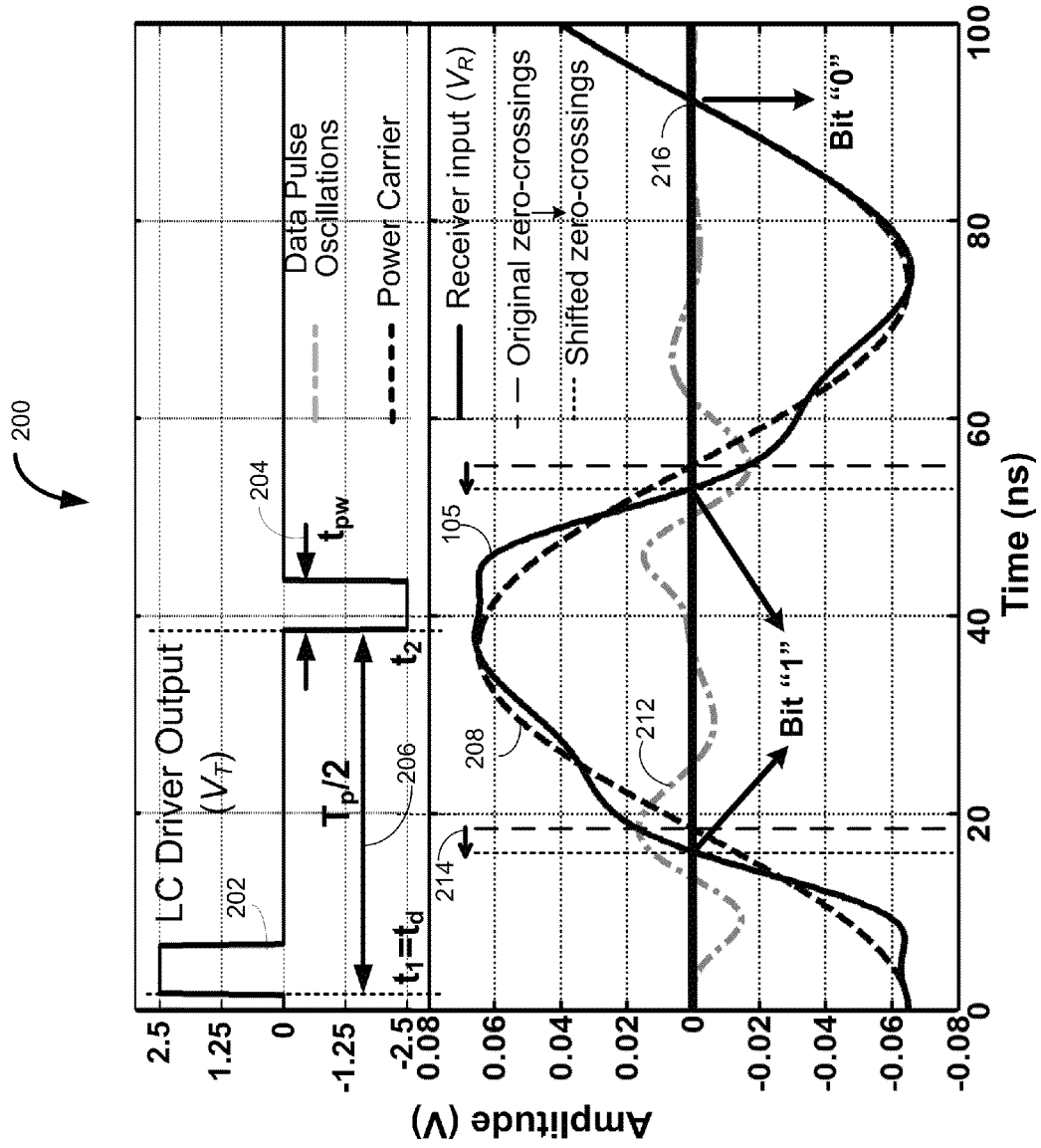
FIG. 2 is an illustration of PDM waveforms (simulated), according to an example implementation.

FIG. 2 depicts simulated PDM waveforms 200 according to an example implementation of the disclosed technology. Using the inductive link impulse responses as discussed in the previous section the receiver input voltage $V_R$ 105 (see FIG. 1) may be calculated. According to one example implementation, instead of using a data carrier for each data bit "1", two narrow pulses 202, equal but opposite in amplitudes with a pulse width 204 of $t_{pw} \leq \sqrt{2}/\pi f_d$ and spaced by a pulse spacing 206 of $T_p/2=\frac{1}{2}f_p$, may be transmitted across the $L_3C_3$-tank. Other example implementations (not shown) may utilize one narrow pulse for each data bit "1" and an opposite polarity narrow pulse for each data bit "0," effectively doubling the data rate. However, as readily apparent to one skilled in the art, the selection of the number of pulses 202 per power carrier 208 cycle may be selected based on a combination of a tolerable bit error rate (BER), needed bandwidth, etc.

FIG. 2 also depicts the interaction of the received data pulse signal 212 with the power carrier signal 208 to produce the receiver input voltage $V_R$ 105. The pulses 202 initiate oscillatory patterns across $L_4C_4$-tank based on equation (9) to produce the received data pulse signal 212. To minimize inter-symbol-interference (ISI) within consecutive "1"s, it may important for these oscillations to dampen quickly. It can be seen from equations (9) and (4) that increasing $\zeta_2\omega_{n2}$, which is proportional to $R_4$, helps damping the oscillations faster. Therefore, the quality factor ($Q_4$) of the $L_4C_4$-tank in FIG. 1 may intentionally be reduced by increasing $R_4$, according to an example implementation of the disclosed technology.

When present, the abovementioned data pulse oscillations 212 change the shape of the received power carrier 208 across $L_4C_4$-tank. To facilitate the detection of these changes, one embodiment of the disclosed technology utilizes the timing of the data pulses 202 in a way that they alter the zero-crossing times of the interfering sinusoidal power carrier, or the receiver input voltage $V_R$ 105. In certain example implementations, the zero-crossing times may be the most sensitive points of the signal to an external disturbance. Hence, in one implementation, the Tx pulses for every bit "1" may be applied at the beginning and in the middle of every bit period in sync with the power carrier 208, and after a specific delay, $t_d$, which is selected such that the voltage peaks of the data oscillations at $V_R$ 105 coincide with the original zero-crossing times of the power carrier interference at $V_R$ 105. The result is a shift 214 in the $V_R$ 105 zero-crossings in a certain direction for bit "1", as shown FIG. 2, while the received "0" bit 216 does not result in the same shift.

According to an example implementation, the pulse pattern generator block 114 in FIG. 1 may set the delay $t_d$ at, $$t_d = nT_p + \frac{\angle H_{14}(j\omega_p)}{\omega_p} - \frac{\angle H_{34}(j\omega_d)}{\omega_d} - \frac{3}{4f_d} + t_{PA}, \quad (10)$$

where n is an integer number, $\angle H_{14}(j\omega_p)/\omega_p$ and $\angle H_{34}(j\omega_d)/\omega_d$ are the delays for power carrier interference and data pulses from $L_1$ to $L_4$ and $L_3$ to $L_4$, respectively, and $t_{P4}$ is the total delay from the Tx-Clk to the power carrier across $L_1C_1$-tank in FIG. 1.

The example transient simulated PDM waveforms 200 as shown in FIG. 2 correspond to the simplified PDM model 100 in FIG. 1, based on equation (9) and the dual-carrier inductive link specifications in Table I (below). For the simulation, two narrow pulses were generated for each data bit "1" after an adjustable delay of $t_d$ on the Tx side with respect to the power carrier. Each pulse creates an oscillation across $L_4C_4$-tank that shifts the zero-crossing times of the induced power carrier interference 105. It can be seen that the superimposed signal, which is labeled as $V_R$ 105, has 2.5 ns zero-crossing time shift 214 to left for bit "1" and no shift 216 for bit "0".

The inductive link specifications for the simulation are shown in Table I below. The power carrier across $L_1C_1$-tank in this simulation was a 50 $V_{P-P}$ sinusoid with 90° phase shift at $f_p$=13.56 MHz. $V_T$ in FIG. 1 is shown on the top trace in FIG. 2 with two $t_{pw}$=5 ns pulses with equal but opposite 2.5 V amplitudes at $t_1=t_d$=1.6 ns and $t_2=t_d+T_p/2$=38.4 ns delay times with respect to the negative peak of the power carrier interference. The resulting signal across $L_4C_4$-tank, shown in dashed gray, demonstrate how these $f_d$=50 MHz oscillations dampen rapidly by t=~35 ns and t=~70 ns before the beginning of the next pulse due to the lowered $Q_4$=5. See the inductive link specifications in Table I.

TABLE I

| | | | | Specifications | | | | | | Mutual Coupling $(k) \times 10^{-3}$ | | | |
| | | | Line Width | | | | | | | | | | |
| Link | Coil | Size (mm) | #Turns | (mm) | L (nH) | **R (Ω) | f (MHz) | Q | SRF (MHz) | $L_1$ | $L_2$ | $L_3$ | $L_4$ |
|---|---|---|---|---|---|---|---|---|---|---|---|---|---|
| Power | $L_1$ | 32 × 32 | 5 | 2 | 500 | 0.5 | 13.56 | 85.2 | 116 | — | 37 | 9 | 6.4 |
| | *$L_2$ | 10 × 10 | 3 | 0.255 | 195 | 0.34 | 13.56 | 48.8 | 237 | 37 | — | 4.2 | 8.5 |
| Data | $L_3$ | 30 × 30 | 1 | 1 | 165 | 0.48 | 50 | 108 | 255 | 9 | 4.2 | — | 19 |
| | $L_4$ | 10 × 10 | 1 | 0.4 | 56.8 | 0.44 | 50 | +40.5 | 550 | 6.4 | 8.5 | 19 | — |

Without data pulse oscillations, the induced power carrier interference across $L_4C_4$-tank may be a clean sinusoid waveform, which is the dashed black waveform labeled as Power Carrier 208 in FIG. 2. The actual received signal, $V_R$ 105 however, which is shown in solid black in FIG. 2, results from the superposition of the data and power components. It can be seen in this illustrative example that the PDM superposition of the data and power components may result in a shift of zero-crossings of the superimposed waveform. For example, in this illustration, and for a bit "1" $V_R$ 105 is shifted by 2.5 ns to the left (e.g., from $t_{zc1(0)}$=18.4 ns and $t_{zc2(0)}$=55.3 ns in the dashed waveform to $t_{zc1(1)}$=15.9 ns and $t_{zc2(1)}$=52.8 ns in the solid waveform, respectively).

According to an example implementation of the disclosed technology, the LC tanks associated with the power Tx coil $L_1$ 101 and the power Rx coil $L_2$ 102 (e.g., $L_1C_1$ and $L_2C_2$ respectively) may be configured for high-Q and both may be tuned at the power transmission frequency ($f_p$) for efficient power transmission. Thus, according to an example implementation, the induced power carrier received at the Rx coil $L_2$ 102 (associated with the $L_2C_2$-tank) may be much stronger than the power carrier that may be induced at the data Tx coil $L_3$ 103 ($L_3C_3$-tank) and data Rx coil $L_4$ 104 ($L_4C_4$-tank). Therefore, in certain example embodiments, the transmitted data pulses may not have any noticeable effects on the power link and the recovered clock signal, $CLK_R$.

In certain example implementations, the pulse delay detector circuit 120 in FIG. 1 may be utilized to recover the serial data bit stream, Rx-Data 124. In certain example implementations, since pulses 202 are transmitted for data bit "1", but not for data bit "0", the delay between zero-crossings of signals across $L_4C_4$ and $L_2C_2$ tanks may be detected by the pulse delay detector circuit 120 to recover the serial data bit stream, Rx-Data 124.

Any detuning of power and data LC-tank circuits in FIG. 1 could affect data recovery in Rx by changing $\angle H_{14}(j\omega_p)$, $\angle H_{34}(j\omega_d)$, and $f_d$, which determine the timing of zero crossings of the power carrier interference and voltage peaks of the data pulse oscillations. According to equation (10), such variations could be compensated by $t_d$, which in one example implementation, is adjustable.

PDM Transceiver Architecture

A PDM transceiver prototype was designed to operate at 13.56 MHz within the industrial-scientific-medical (ISM) band. It should be noted that regulatory compliance due to Rx oscillations at $f_d$=50 MHz is not a concern in the near-field short-range communications, where the transmission range is short in comparison to far-field communications. Although this disclosure discusses the transceiver configured for downlink, it can also be used for uplink

Transmitter Design

Power Transmitter

Figure 3:
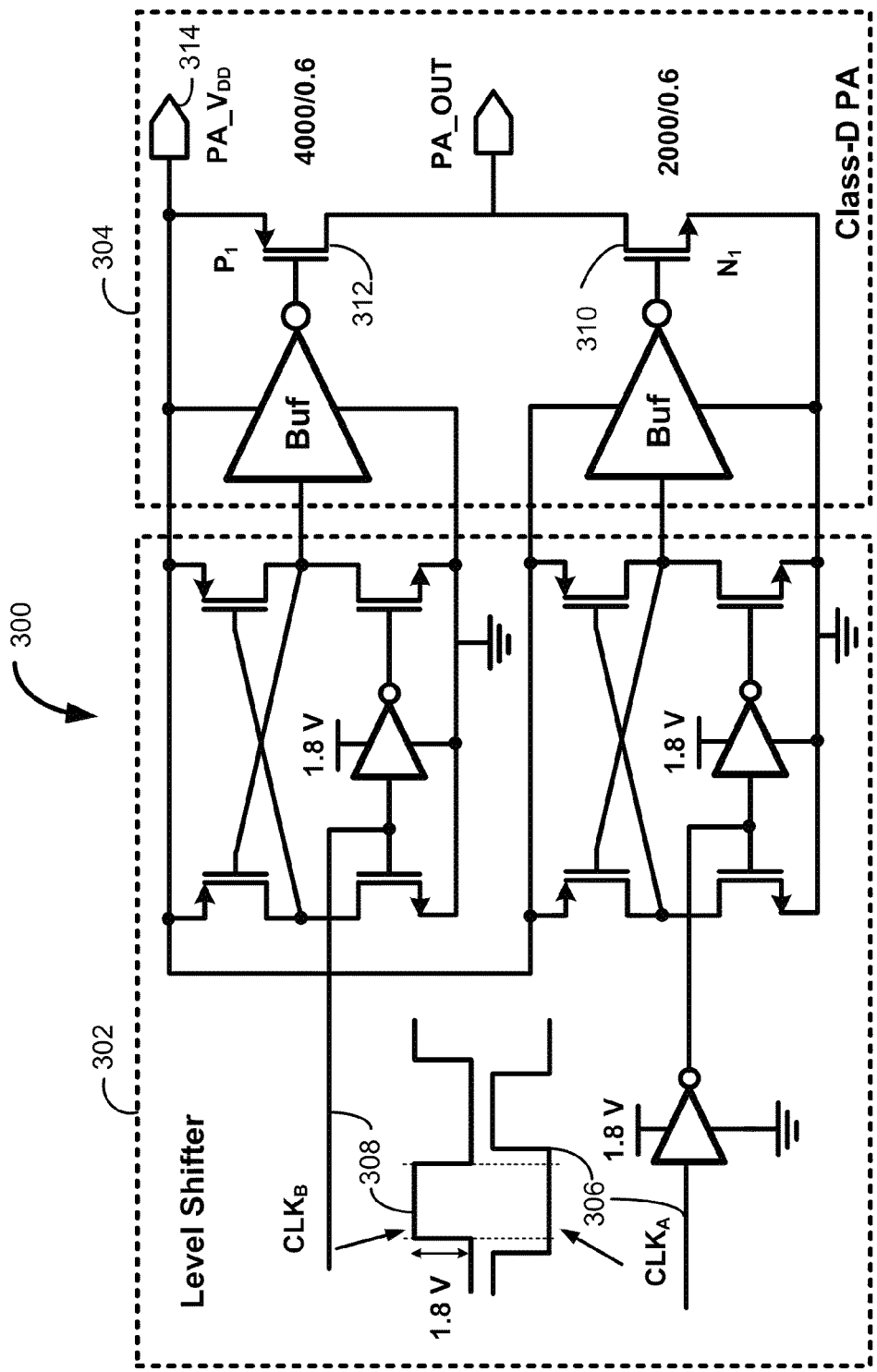
FIG. 3 depicts a schematic diagram of the class-D power amplifier (PA) followed by the level shifter, according to an example implementation of the disclosed technology.

FIG. 3 depicts example circuitry 300 that may be utilized in the PDM power transmitter. For example, according to one example embodiment, the circuitry 300 may include a level shifter 302 and a class-D power amplifier (PA) 304. In an example implementation, the PA 304 (for example, as depicted in FIG. 1) may drive $L_1$ 101 through a 50Ω matching circuit. In an example implementation, the PA 304 may be driven by a pair of non-overlapping clocks $CLK_A$ 306 and $CLK_B$ 308 to avoid instantaneous large currents in the output stage transistors, $N_1$ 310 and $P_1$ 312. According to an example embodiment, the output stage transistors, $N_1$ 310 and $P_1$ 312 may operate as switches and may be configured with approximately four ohms of "on" resistance (e.g., when conducting). In other embodiments, the output stage transistors $N_1$ 310 and $P_1$ 312 may be configured such that the conduction output "on" resistance is between about one ohm and about eight ohms.

In an example implementation, the amplifier power supply, $PA\_V_{DD}$ 314, may be adjustable. For example, in one implementation, $PA\_V_{DD}$ 314 may be adjustable between about 1.8 V to about 5 V to control the PA 304 output power up to 340 mW. In accordance with an example implementation, the level shifter 302 circuitry may be utilized at the PA 304 input to convert the non-overlapping clocks 306 308 from 1.8 V to the $PA\_V_{DD}$ 314 level. In this example embodiment, the maximum PA output power is 340 mW when $PA\_V_{DD}$ 314=5 V. According to certain example embodiments, the adjustable feature of the PA 304 may be utilized to control the amount of transmitted power, independent of the clock amplitude.

Data Transmitter

Figure 4A:
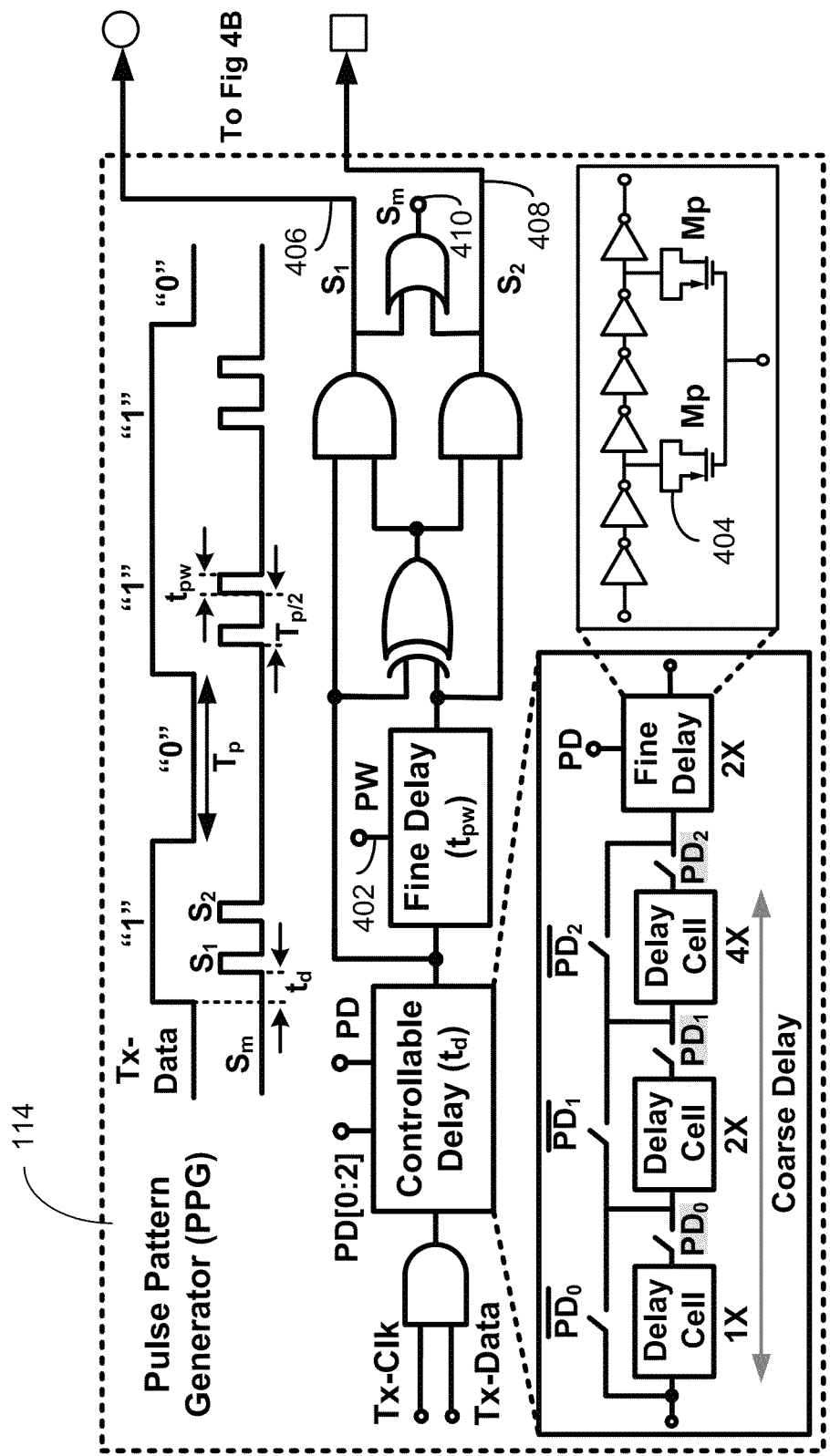
FIG. 4A is a schematic diagram of the data transmitter (Tx) block in the PDM transceiver, according to an example implementation.
Figure 4B:
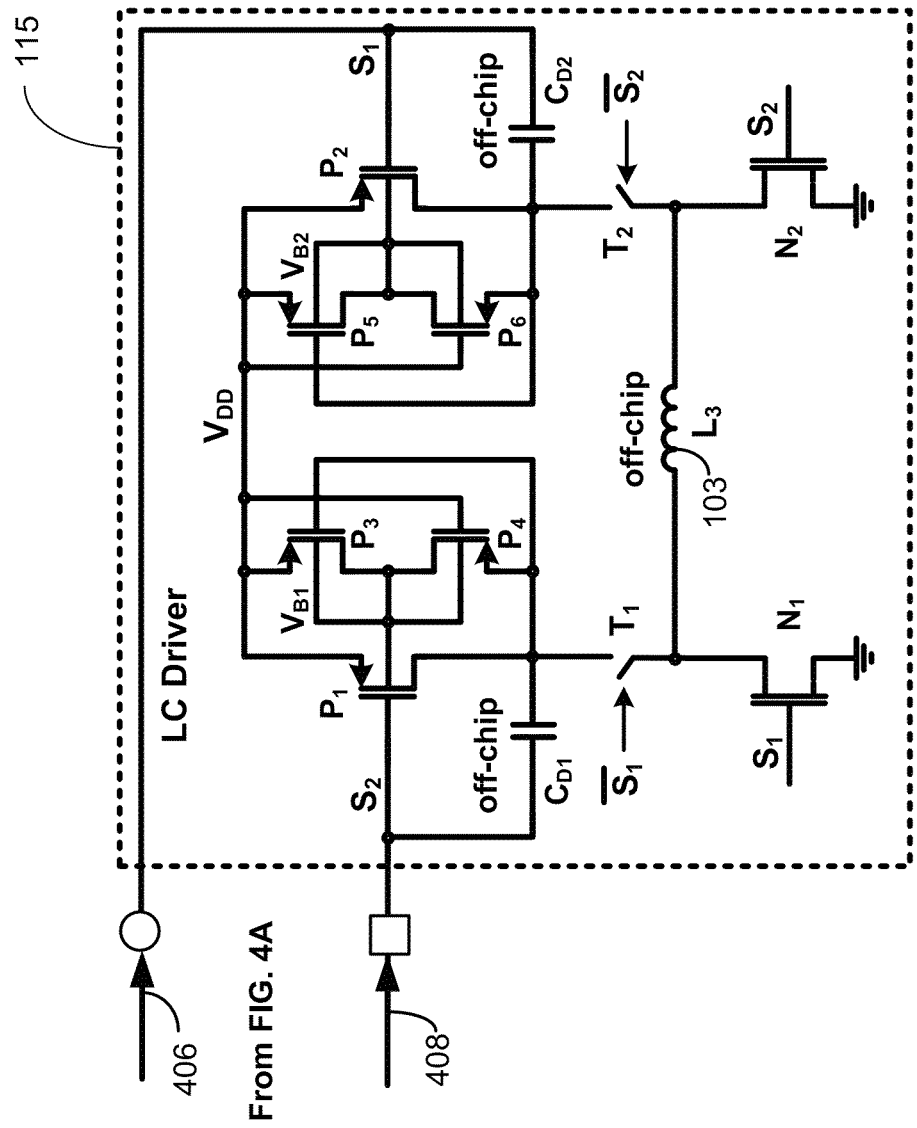
FIG. 4B is a schematic diagram of an LC driver, according to an example implementation.

FIGS. 4A and 4B depict example embodiments of the PDM data transmitter circuitry. FIG. 4A depicts circuitry of an example pulse pattern generator (PPG) 114. According to an example implementation of the disclosed technology, with each $T_p$ period, the PPG 114 may be utilized to generate pulses (for example $S_1$ and $S_2$) spaced by $T_p/2$, with adjustable width and delay for data bit "1" (but no pulses for bit "0"). Therefore, the data rate (DR) in this PDM implementation may be the same as the power transmission frequency $f_p$. According to an example embodiment, the width of data pulses, $t_{pw}$, may be continuously adjustable from about 3 ns to about 8 ns via the PW 402 input node. According to an example implementation, the data pulse delay, $t_d$, may be adjustable from about 5 ns to about 71 ns to compensate for process variations by a combination of a coarse delay, controlled by three binary-weighted bits ($PD_{0-2}$) from 0-56 ns with 8 ns steps, and a fine delay, controlled by an analog input (PD), from 5-15 ns. In an example implementation, the coarse delay may be generated by accumulating propagation delays of a series of capacitive-loaded inverters. The parasitic capacitances of one or more PMOS transistors, $M_p$ 404, which vary with their gate voltage, may be utilized in an example embodiment to generate the fine delay. In a example embodiment, $S_1$ 406 and $S_2$ 408 may be combined in an OR gate to generate $S_m$ 410 for monitoring. The pattern pulse generator (PPG) block 114, in an example embodiment, may be configured to generate two pulses with $T_p/2$ spacing and having adjustable width ($t_{pw}$) and delay ($t_d$).

Figure 4C:
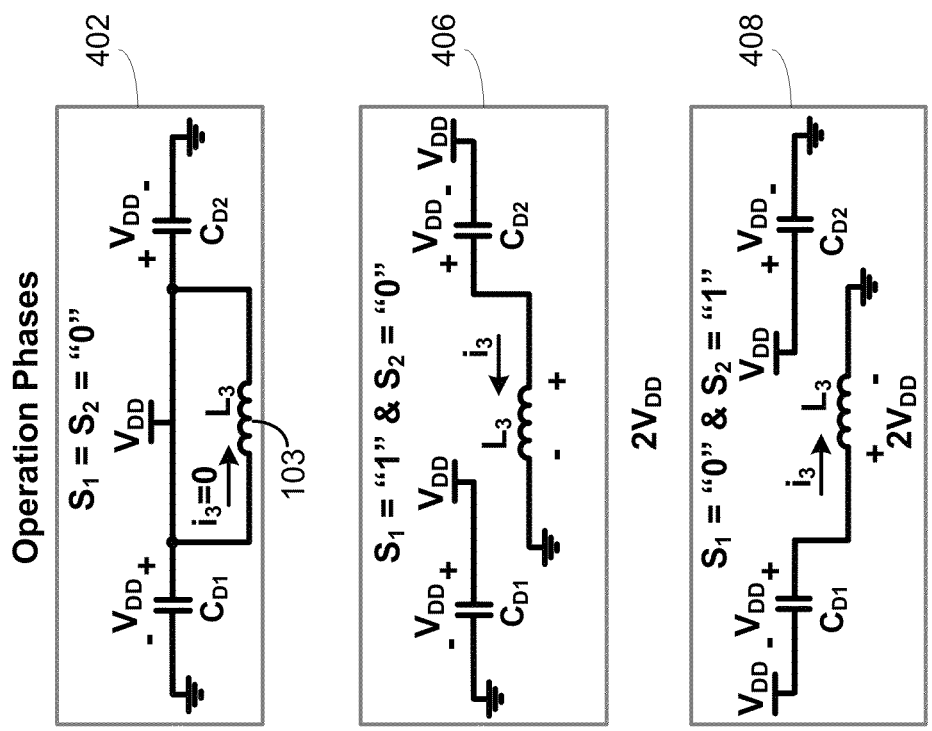
FIG. 4C depicts operational phases of the current control through a coil, according to example embodiments of the disclosed technology.

FIG. 4B depicts circuitry of an example implementation of the disclosed technology, the LC driver 115 may apply narrow pulses across $L_3$ 103, in a similar fashion to conventional H-bridge drivers, but with the capability of greater signal amplitudes. For example, and as depicted in FIG. 4B, the LC driver 115 may be utilized to quadruple the supply voltage, $V_{DD}$, across the Tx data coil, $L_3$ 103. For example, for each data bit "0", $S_1=S_2=0$, $T_{1,2}$ and $P_{1,2}$ turn on, and $N_{1,2}$ turn off. Therefore, both $L_3$ 103 nodes are connected to $V_{DD}$ and off-chip $C_{D1}$ and $C_{D2}$ capacitors are charged to $V_{DD}$ via $P_{1,2}$, (as shown on the top of FIG. 4C). In this condition, no current passes through $L_3$ 103 and no voltage change is induced across the corresponding Rx data coil, $L_4$ 104 (or the $L_4C_4$-tank). In the driver circuit, $P_{3-6}$ may be utilized to dynamically bias the bulks of $P_{1,2}$ to the highest voltage to avoid current flow in the bulk. FIG. 4C depicts the zero current operational phase 402 for this example scenario for a data bit "0."

Referring again to FIG. 4B, and according to an example implementation, for each data bit "1", after a delay of $t_d$, $S_1$ may toggle to "1" for $t_{pw}$, during which $P_2$ and $T_1$ turn off, $N_1$ turns on, and $C_{D2}$ is in series with $L_3$ 103 while the left node of $L_3$ 103 is connected to ground via $N_1$. FIG. 4C depicts operational phases 406 408 of the current control through a coil. As shown by the first current operational phase 406, the voltage across $L_3$ 103 may increase to $2 \times V_{DD}$ and its current, $i_3$, may ramp up (from right to left) at a rate of $di_3/dt=2 \times V_{DD}/L_3$ (ignoring the voltage drops across $N_1$ and $T_2$ in this simplified analysis). The $di_3/dt$ is responsible for inducing a voltage across the Rx data coil, $L_4$ 104 (or the $L_4C_4$-tank), which is the data part of $V_R=M_{34}di_3/dt \propto 2 \times V_{DD}$. According to an example embodiment, to end the first pulse, $S_1$ may be toggled back to "0", at which time $T_1$ shorts the left node of $L_3$ to $V_{DD}$ and provides a path for $i_3$ to return back to zero without causing undesired oscillations. After a delay of $T_p/2$, $S_2$ may be toggled to "1", resulting in a current pulse in $L_3$, similar to that of $S_1$ but in the opposite direction (left to right), as shown in the second current operational phase 406.

By doubling the voltage across $L_3$ 103 in each direction, embodiments of the LC driver 115 can improve the communication range and robustness of inductively powered telemetry links, especially those designed in low-voltage technology nodes. It should be noted that in this design, since $S_2$ is already out-of-phase with respect to $S_1$, resulting in $i_3$ flowing in opposite directions, the induced data pulse oscillations across $L_4C_4$-tank also have opposite polarity, and change the zero-crossing times of power carrier interference in the same direction (as shown in FIG. 2).

Receiver Design

Power Management

Figure 5:
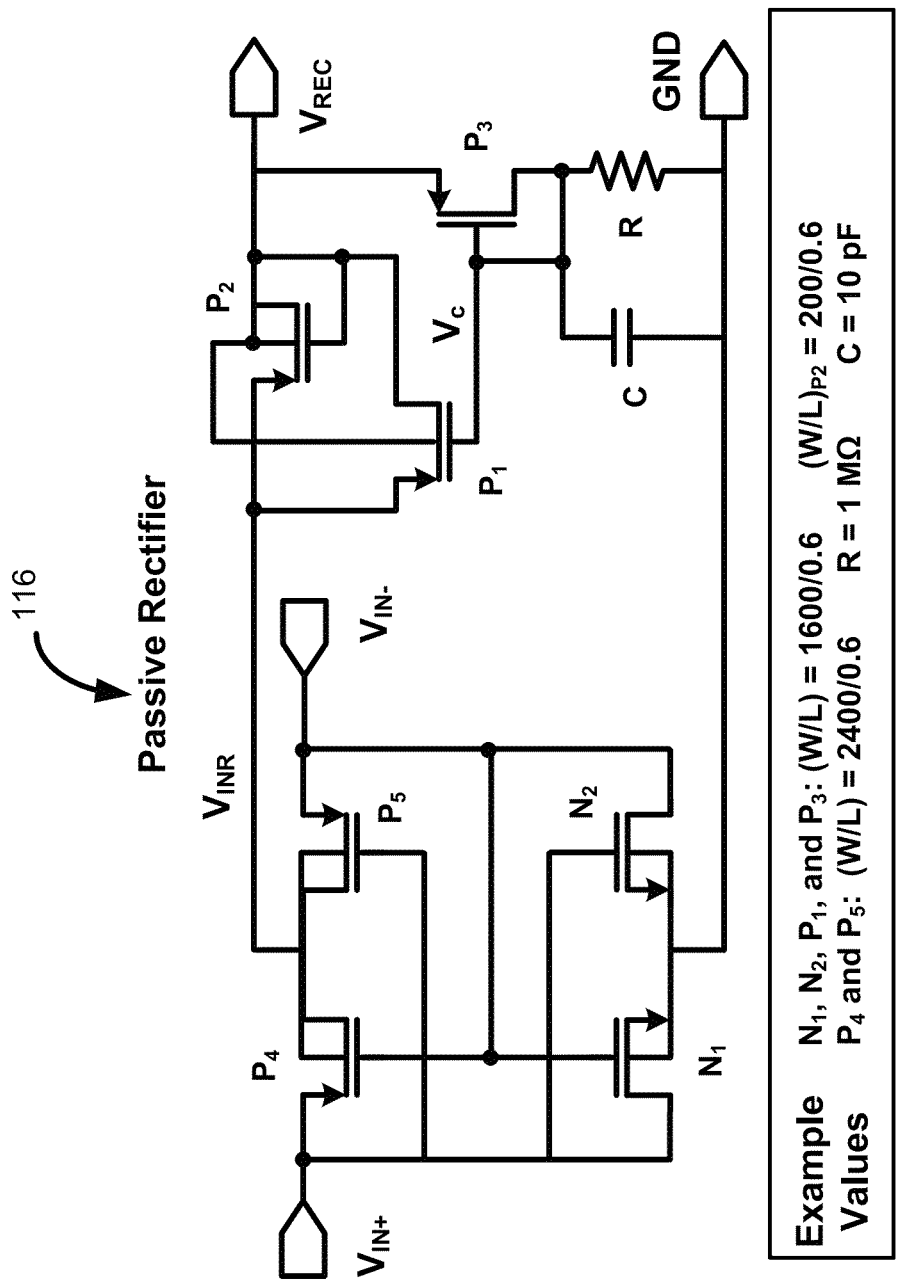
FIG. 5 is a schematic diagram of the full-wave passive rectifier with self-threshold-cancellation scheme, according to an example implementation of the disclosed technology.

FIG. 5 shows the schematic diagram of an example full-wave passive rectifier 116 in the PDM power receiver with a self-threshold-cancellation scheme, according to an example embodiment of the disclosed technology. In this example scheme, initially $V_{REC}$ 502 reaches $V_{INR}$ 504-$V_{Th(P2)}$ through $P_2$, leading to $V_C=V_{REC}-V_{Th(P3)}=V_{INR}-2V_{Th(P2,3)}$. Since $V_{SG(P1)}=V_{INR}-V_C=2V_{Th(P2,3)}>V_{Th(P1)}$, $P_1$ is pushed into triode, and $V_{REC}$ is charged up until $V_C$ becomes $V_{INR}-V_{Th(P1)}$. Therefore, $V_{REC}$ finally reaches $V_{INR}-V_{Th(P1)}+V_{Th(P3)}$, which means that $P_{1-3}$ play the role of a diode with effective voltage drop of $V_{Th(P1)}-V_{Th(P3)}$. This significant reduction in the threshold voltage improves the power conversion efficiency (PCE). $N_1$, $N_2$, $P_4$, and $P_5$ are used for full-wave rectification. In this example passive rectifier 116 circuit, $P_{1-3}$ play the role of a diode with effective voltage drop of $V_{Th(P1)}-V_{Th(P3)}$, which may improve the PCE.

Data Receiver

According to an example implementation of the disclosed technology, and as shown in the Receiver (Rx) 110 side of FIG. 1, $V_R$ 105 can be amplified by a high gain amplifier 107 followed by two inverters to create a square waveform, $V_A$. In an example implementation, a pulse delay detector 120 is then used to detect the phase shift (delay) between $V_A$ and the recovered clock from the $L_2C_2$-tank ($CLK_R$) to detect "1"s and "0"s in the data bit stream.

Figure 6:
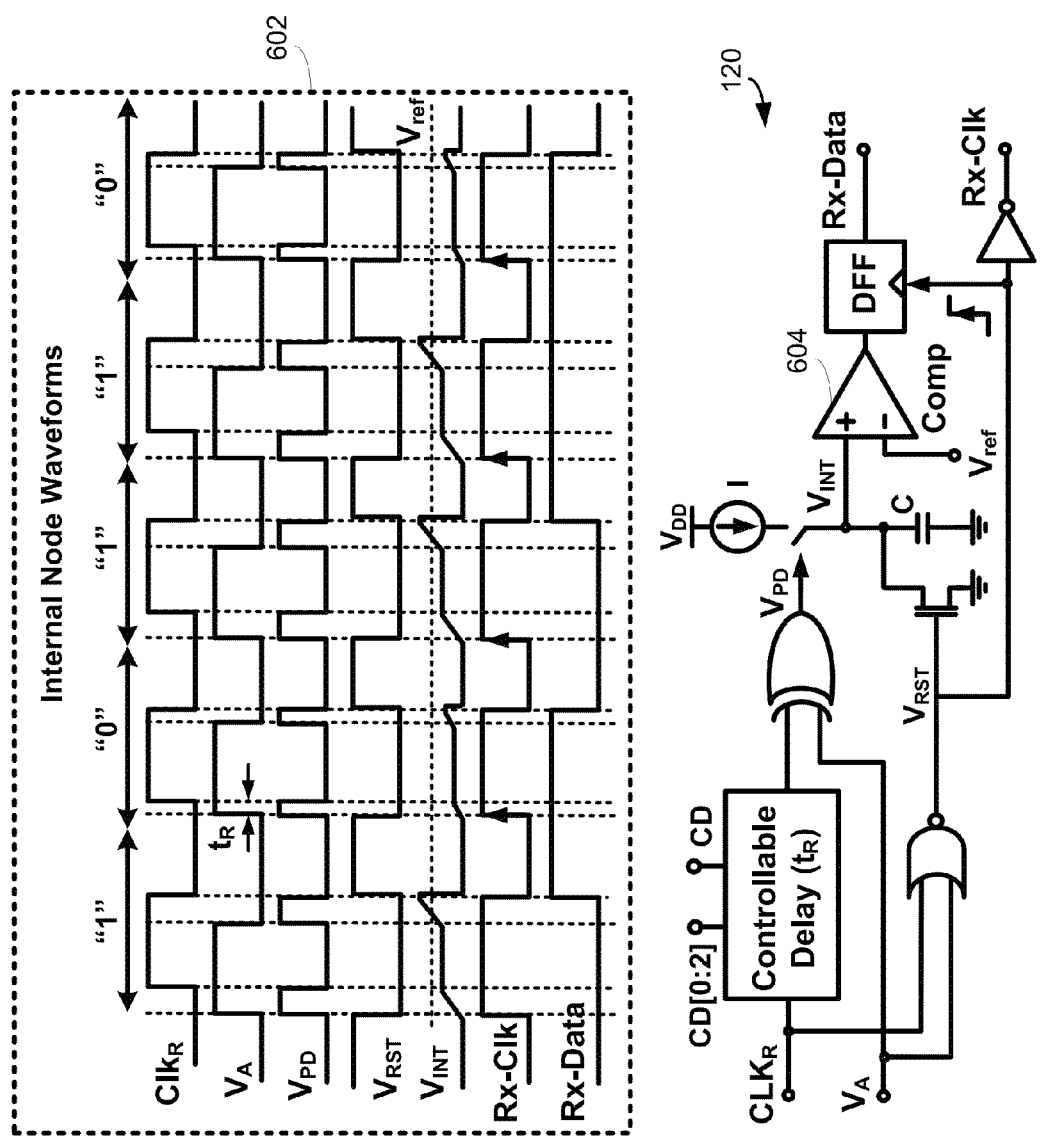
FIG. 6 is a schematic diagram, according to an example implementation, of the pulse delay detector with its operating waveforms to recover the data bit stream and clock. Rx-Data is ready to be sampled at the rising edge of the Rx-Clk as shown in the waveforms.

FIG. 6 shows an example schematic diagram of the pulse delay detector 120 with its key internal node waveforms 602. $CLK_R$, for example, represents the recovered clock. $V_A$ is similar to $CLK_R$, but difference is the delay in the rising and falling edges. According to an example implementation of the disclosed technology, a delay between $V_A$ and $CLK_R$ can be detected by an XOR gate, which is represented by $V_{PD}$. During one $T_p$, an integrator may be utilized, according to an example embodiment, to accumulate the energy inside $V_{PD}$ pulses by charging a capacitor, C=1.1 pF, with I=100 µA. The integrator output, $V_{INT}$, may then be compared with an externally-adjustable reference voltage, $V_{ref}$, to detect data bit "1". $V_{ref}$ can be adjusted such that the integrator output is greater than $V_{ref}$ for "1"s and smaller than $V_{ref}$ for "0"s. $V_A$ and $CLK_R$ may also be combined in a NOR gate to generate the reset signal, $V_{RST}$, to discharge C and prepare the integrator for the next data bit. To recover short pulses at the comparator 604 output, a D-type flip-flop may be clocked at the rising edge of $V_{RST}$. Therefore, Rx-Data may be ready to be sampled at the rising edge of the Rx-Clk. A small delay ($t_R$) between $CLK_R$ and $V_A$ may be required to set the integrator output, $V_{INT}$, within the input common mode range of the comparator. In an example implementation, the small delay $t_R$ may be continuously adjustable from about 5 ns to about 71 ns to compensate for process variations by a combination of fine and coarse delays, controlled by CD and CD[0:2], respectively.

Figure 7B:
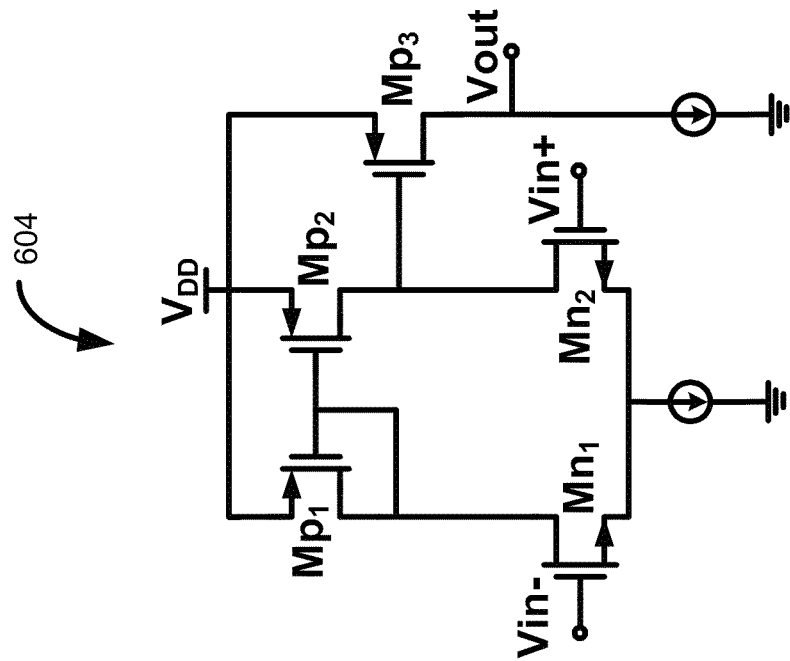
FIG. 7B is a schematic diagram of a Rx comparator, as shown in FIG. 6.
Figure 7A:
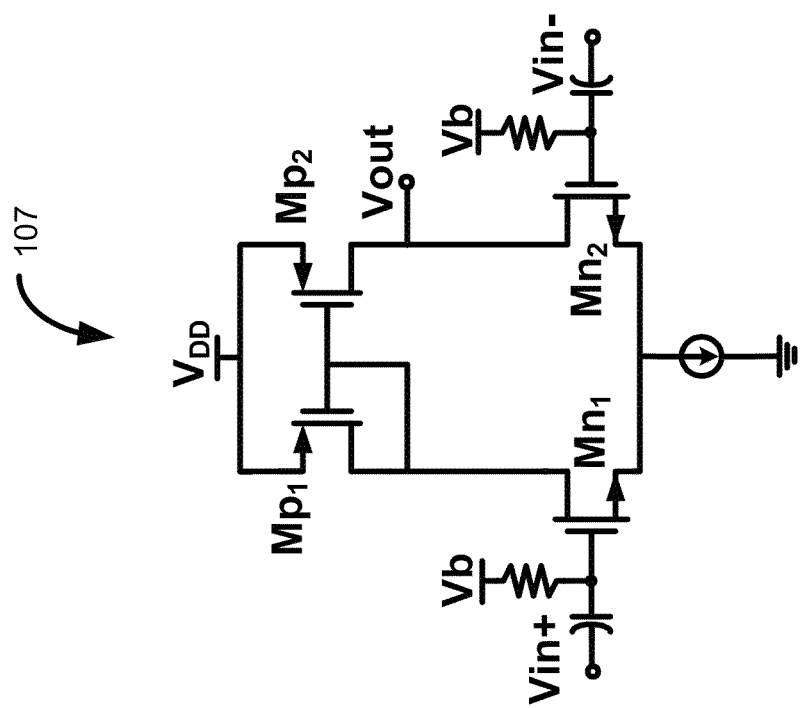
FIG. 7A is a schematic diagram of the receiver (Rx) amplifier, as shown in FIG. 1.

FIG. 7A depicts a schematic diagram of an example embodiment of the PDM Rx amplifier 107 (for which $V_R$ 105 provides input, as shown in FIG. 1). FIG. 7B depicts a schematic diagram of an example embodiment of the high-speed comparator 604 (as shown in block form in FIG. 6). Because the nMOS differential pair is used in the comparator 604, a small delay between $CLK_R$ and $V_A$, $t_R$ (as shown in FIG. 6) may be required for the data bit "0" to set $V_{INT}$ within the input common mode range (ICMR) of the comparator. A controllable delay with a circuit diagram identical to the one shown in FIG. 4 may generate $t_R$. In one example implementation, the amplifier 107 gain is 22.5 dB at $f_d$=50 MHz and the static power consumptions of the amplifier and comparator are about 156 µA and about 127 µA, respectively.

Prototype and Experimental Results

Figure 8:
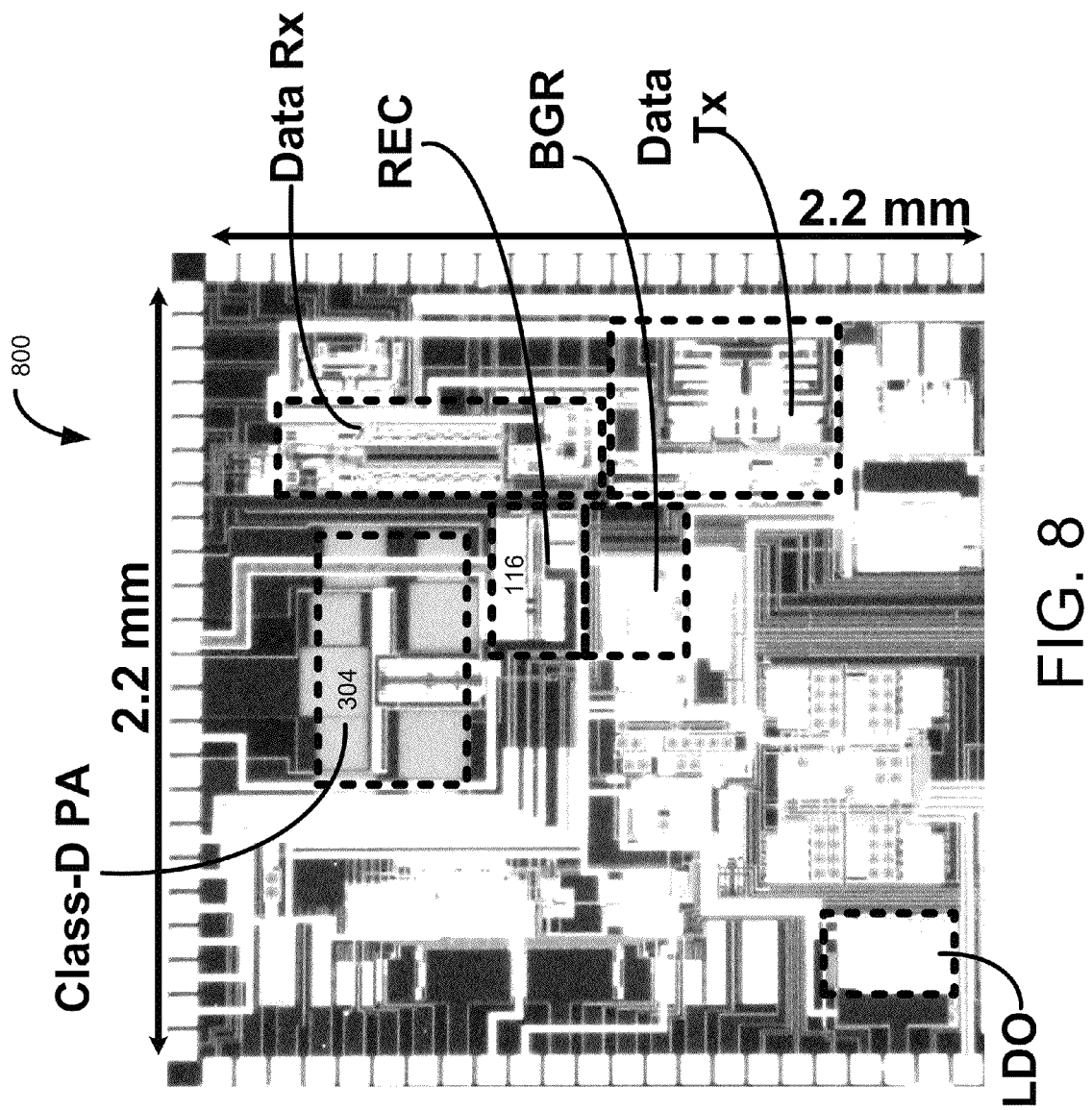
FIG. 8 is a microphotograph of a PDM transceiver prototype circuit.

FIG. 8 is a microphotograph 800 of a PDM transceiver prototype circuit that was fabricated in a 0.35-µm 2P4M standard CMOS process, occupying 1.6 mm² of chip area. Two PDM chips were used in the experimental setup and were wirebonded to QFN packages mounted on 2-layer FR4 printed circuit boards (PCBs). Each PCB included a planar figure-8 coil for data transmission (as depicted below in FIG. 9B). The micrograph 800 also shows approximate circuitry regions, including a band gap reference (BGR) for constant current that that does not change with temperature, etc.; a low drop out (LDO) regulator, which can operate with a very small input-output differential voltage; Data Rx circuitry; Data Tx circuitry; the Class-D PA 304, and the passive rectifier (REC) 116.

Figure 9A:
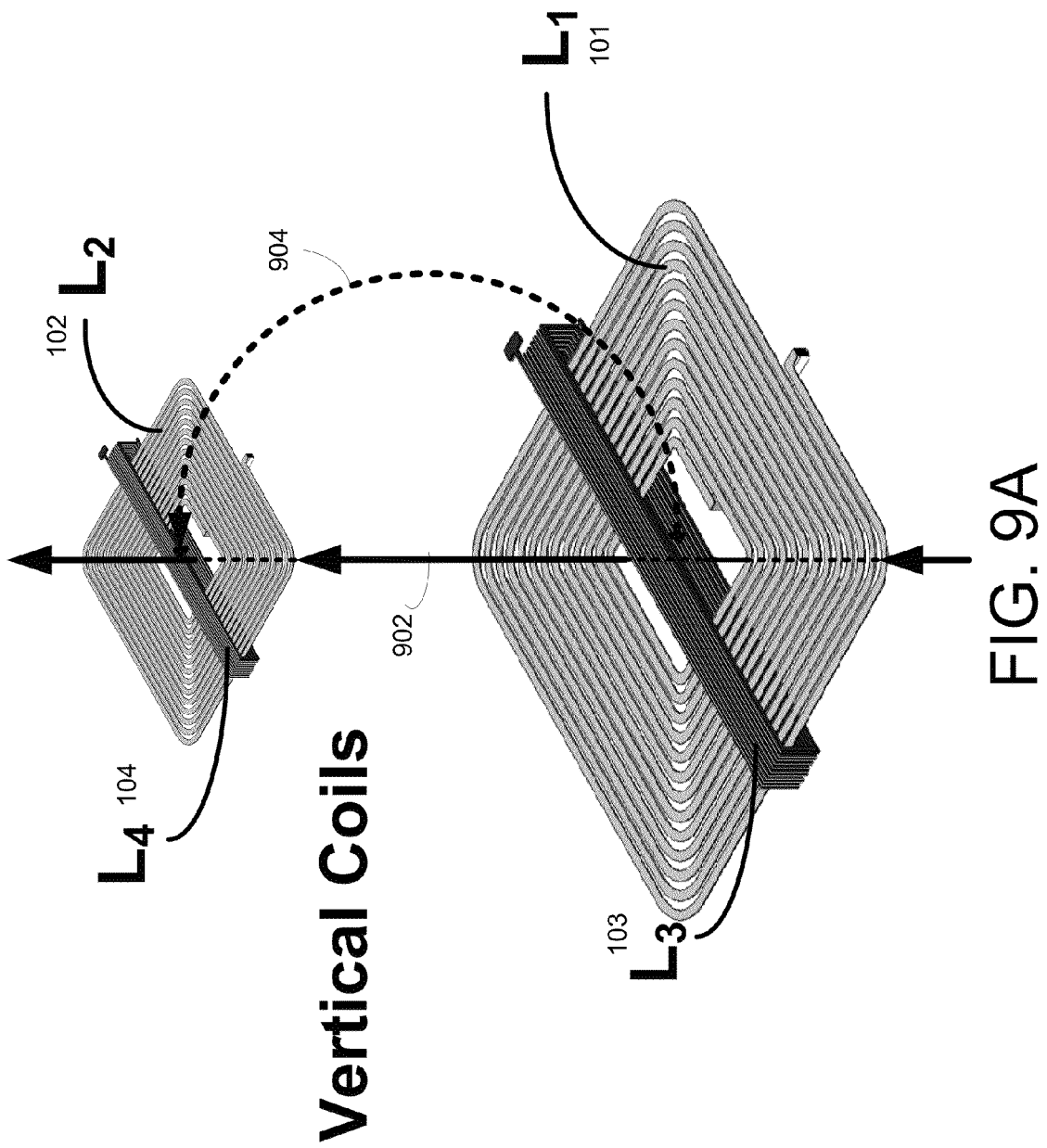
FIG. 9A illustrates a pair of power and signal Rx and Tx coils arranged in a vertical configuration, according to an example implementation of the disclosed technology.
Figure 9B:
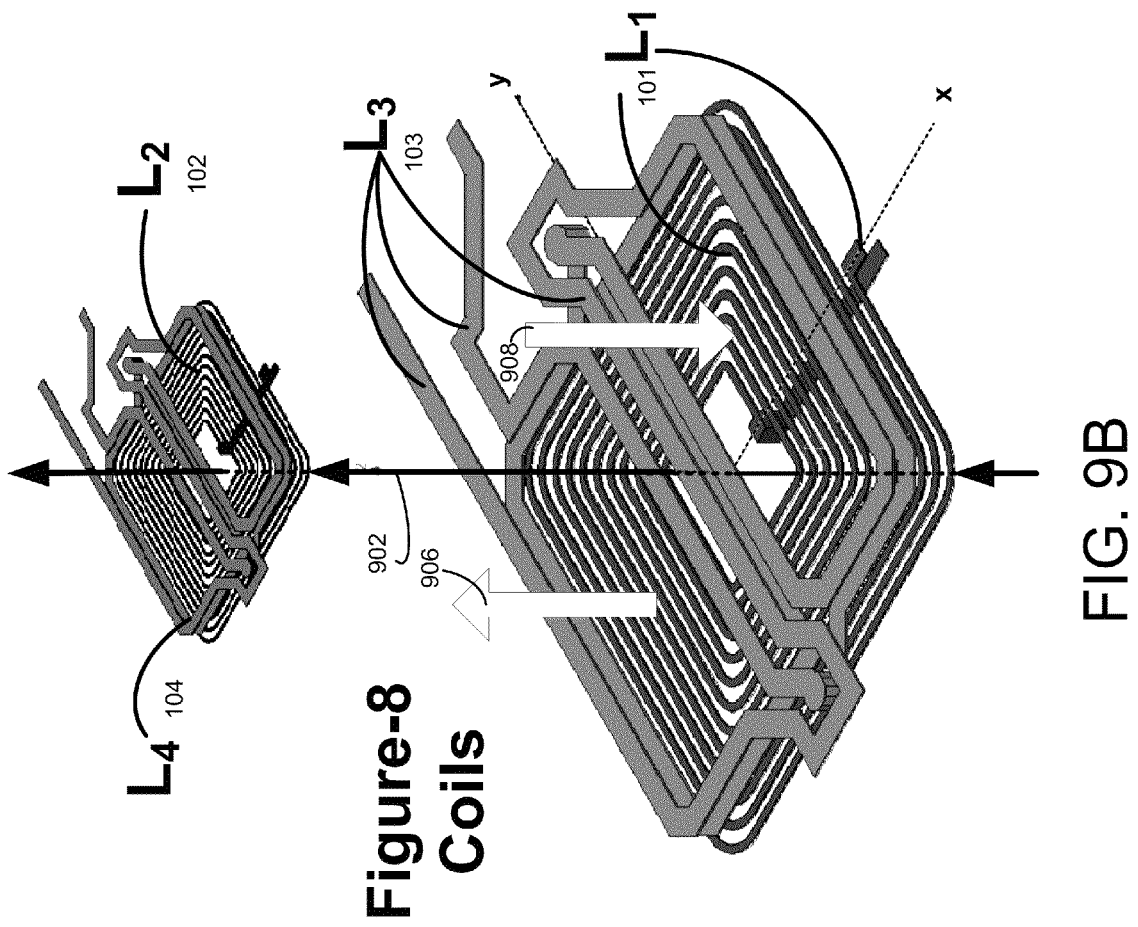
FIG. 9B illustrates a pair of power and signal Rx and Tx coils arranged in a figure-8 configuration, according to an example implementation of the disclosed technology.

FIGS. 9A and 9B depict example configurations of the power Tx coil $L_1$ 101, the power Rx coil $L_2$ 102, the data Tx coil $L_3$ 103, and a data Rx coil $L_4$ 104. According to an example implementation of the disclosed technology, the (strong) power field 902 induced by current in the power Tx coil $L_1$ 101 can wirelessly induce current in the corresponding power Rx coil $L_2$ 102, in part due to the coil orientations. In certain embodiments, the power field 902 also can induce small currents in the data Tx coil $L_3$ 103, and a data Rx coil $L_4$ 104. The configuration shown in FIG. 9A can help minimize the induced currents in the data Tx coil $L_3$ 103 and the data Rx coil $L_4$ 104. For example, and according to certain embodiments, the data Tx coil $L_3$ 103 and the data Rx coil $L_4$ 104 may be oriented perpendicular with respect to the power field 902 so that it does not induce a strong current in the data Tx coil $L_3$ 103 or the data Rx coil $L_4$ 104. According to an example embodiment, the data field 904, induced by current in the data Tx coil $L_3$ 103, can provide wireless data transmission to the data Rx coil $L_4$ 104.

FIG. 9B depicts an example figure-8 configuration of the data Tx coil $L_3$ 103 and the data Rx coil $L_4$ 104. In this example embodiment, the interference current induced by the power field 902 (generated by current in the power Tx coil $L_1$ 101) in one loop of the figure-8 coils can oppose the current induced in the other loop. Thus, according to an example implementation, the overall induced interference current may be weakened or minimized; while the respective fields 906 908 generated by current in the figure-8 data Tx coil $L_3$ 103 may induce the data signal in the respective data Rx coil $L_4$ 104.

In the construction of an experimental prototype, $L_1$ 101 was carefully aligned and glued behind $L_3$ 103 to minimize $k_{13}$. $L_2$ 102 was also glued over $L_4$ 104 with careful alignment to minimize $k_{24}$. The geometries of a printed spiral coil in the Tx and a wire-wound coil in the Rx were optimized at 13.56 MHz for power transmission. $L_1$ 101 and $L_2$ 102 were glued onto $L_3$ 103 and $L_4$ 104, respectively, following careful alignment to minimize undesired cross couplings between power and data coils, $k_{13}$ and $k_{24}$. The specifications of power and data coils are summarized in Table I. At PA_$V_{DD}$=5 V, which is the maximum voltage in this process, the class-D PA delivered 340 mW to a 50Ω load with measured 61.8% power efficiency at $f_p$=13.56 MHz.

Figure 10A:
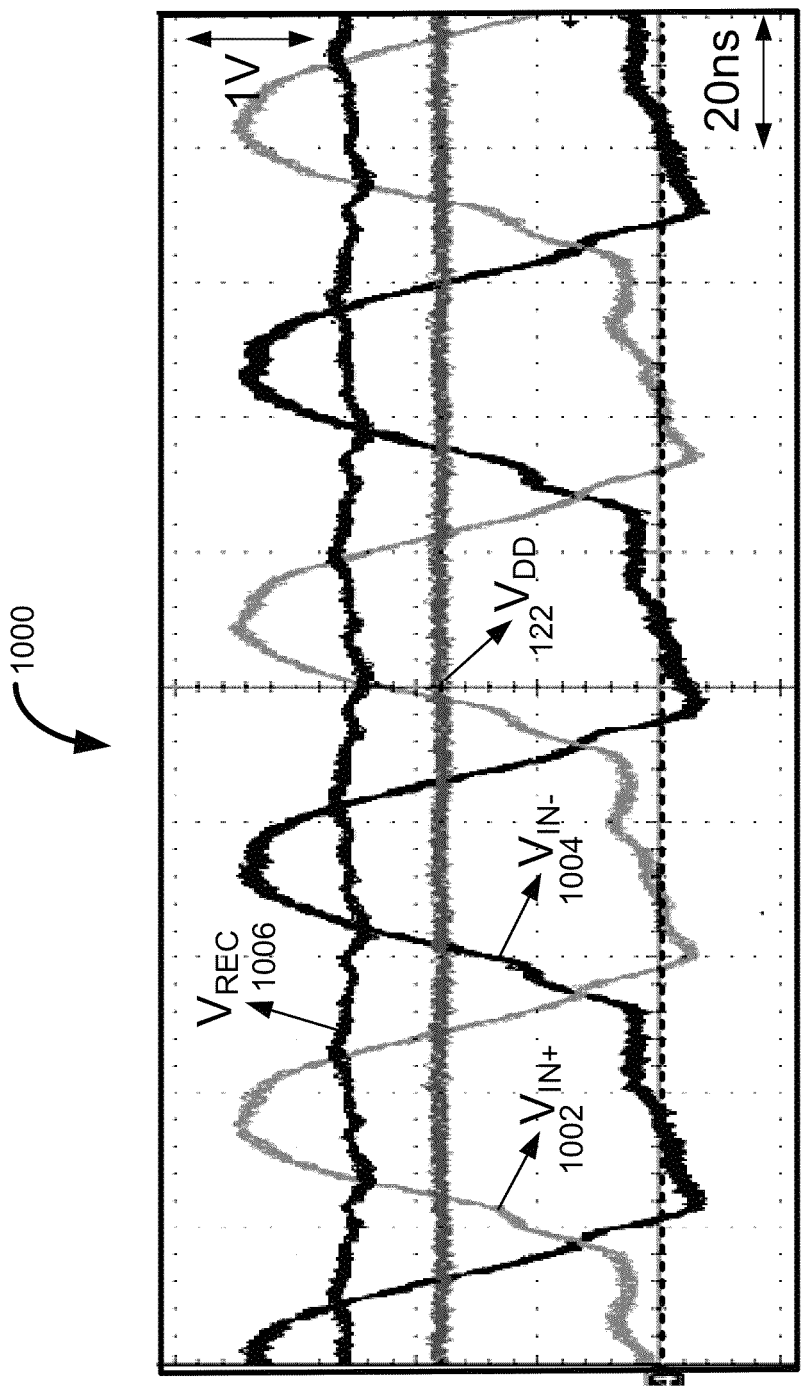
FIG. 10A shows experimental results for the passive rectifier measured input and output waveforms at 13.56 MHz when loaded by $C_L$=10 µF and $R_L$=0.4 kΩ. The regulator output at $V_{DD}$=1.8 V is also shown.

FIG. 10A shows the passive rectifier (for example, the passive rectifier 116 of FIG. 1 and FIG. 5) measured input and output voltage waveforms 1000 when loaded by $C_L$=10 μF and $R_L$=0.4 kΩ. In this condition, for $V_{REC}$ 1006=2.5 V, the peak of the 13.56 MHz carrier was 3.6 V. FIG. 10A also shows the regulator output, $V_{DD}$ 122=1.8 V, across a 10 μF capacitor. The maximum ripple on $V_{DD}$ 122 was 50 mV, which was acceptable in our digital-based Rx. Also shown in the waveforms 1000 are the $V_{IN+}$ 1002 and $V_{IN-}$ 1004.

Figure 10B:
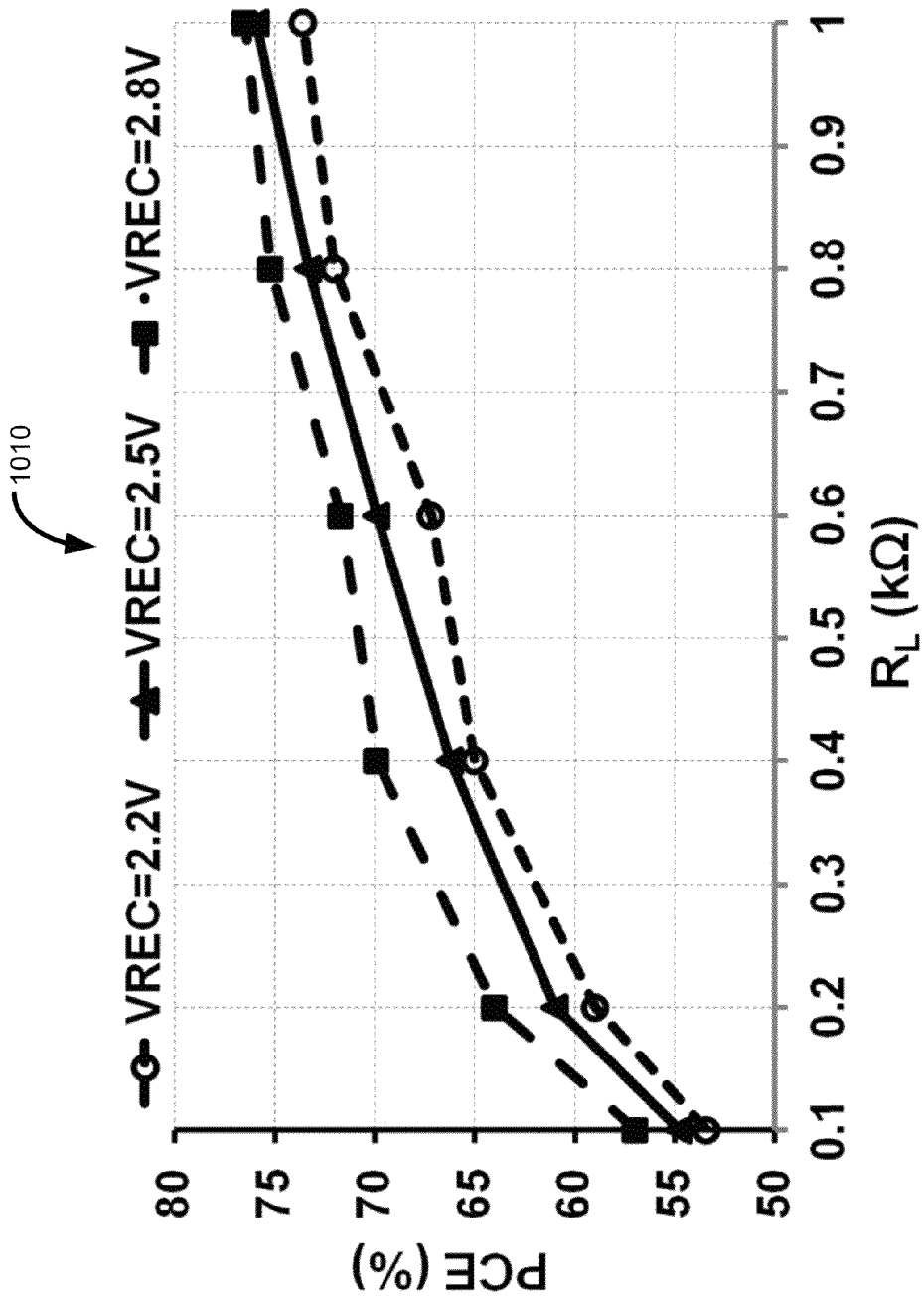
FIG. 10B shows the rectifier power conversion efficiency (PCE) vs. $R_L$ for different $V_{REC}$ values.

FIG. 10B shows measurement results 1010 of the passive rectifier (for example, the passive rectifier 116 of FIG. 1 and FIG. 5) measured power conversion efficiency (PCE) vs. $R_L$ at 13.56 MHz for different $V_{REC}$ values. For example, as $R_L$ increases, the voltage drop across the rectifier pass transistor (i.e. $P_1$ in FIG. 5) reduces, which decreases the rectifier power loss and, therefore, increases the PCE. At high $V_{REC}$ values, the PCE is slightly increased because the rectifier voltage drop is relatively smaller. For a wide range of $R_L$, the rectifier PCE is >50%.

FIG. 11 is a chart 1100 of measured waveforms (compare to the simulated waveforms 200 as shown in FIG. 2). For example, starting from the top-most waveform in FIG. 11 and moving downwards, the chart 1100 shows the Tx-Data 112 with transmitted data bits of "1" 1102 and "0" 1104 at 13.56 Mbps. The next waveform $S_m$ 410 shows the monitored PPG 114 output (for example, the $S_m$ 410 as shown in FIG. 4A). The next waveforms 1106 1108 1110 were measured across the $L_4C_4$-tank (i.e, at $V_R$ 105 in FIG. 1) and amplified by about 20 dB by a discreet amplifier. For example, data oscillation waveform 1106 was measured when the power carrier was not present; the power carrier interference waveform 1108 was measured when the when data oscillations 1106 were not present; and the superposition of data and power components in the received signal waveform 1110 when both power carrier 1108 and data oscillations 1106 were present are shown in the bottom waveform 1110. As shown in the received signal waveform 1110, the data oscillations 1106 have shifted the zero-crossings 1112 of the power carrier 1108 to the left by 2.3 ns. In this measurement, d=10 mm, $t_d$=28 ns, and PA_$V_{DD}$=4 V. The power link was able to deliver 42 mW of regulated power to the Rx and measured SIR was −18.5 dB. It should be noted that SIR is defined as the ratio of the energy inside data pulse oscillations for the data bit "1" to that inside the power carrier interference during one data bit period ($T_p$).

Figure 12:
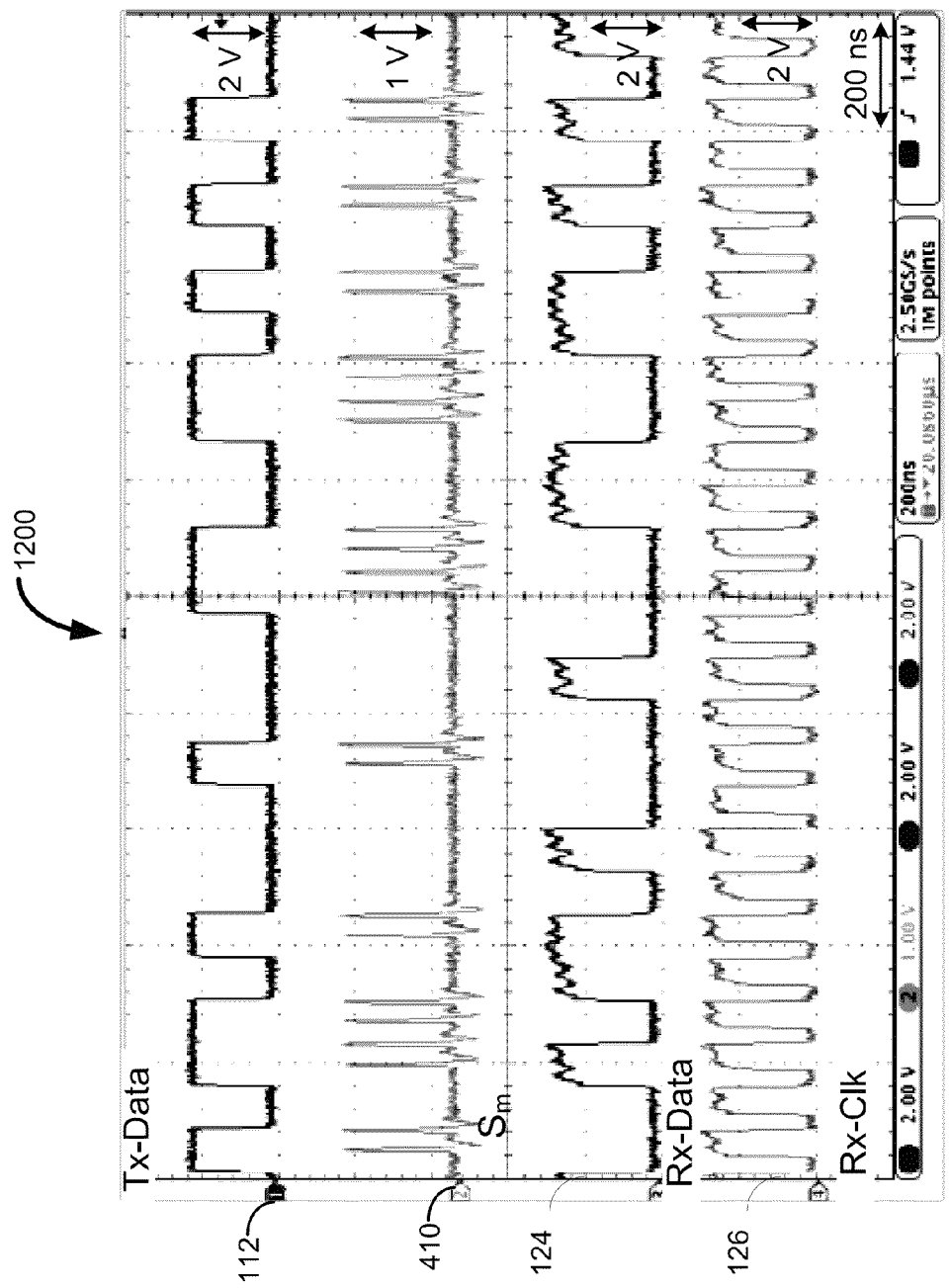
FIG. 12 shows measured PDM transceiver waveforms from the top: Transmitted serial data bit stream at 13.56 Mbps, the PPG output signal ($S_m$ in FIG. 4), recovered data bit stream, and recovered clock.

FIG. 12 shows measured waveforms 1200 in the experimental PDM transceiver setup. The two top waveforms 112 410 are from transmitter, and the two bottom waveforms 124 126 are from receiver side. For example, shown from top to bottom in FIG. 12 are the Tx-Data 112 (the transmitted serial data bit stream at a data rate (DR)=13.56 Mbps) the PPG output 410 (for example, $S_m$ 410 in FIG. 4); the recovered serial data bit stream Rx-Data 124; and recovered clock Rx-Clk 126. Parameters utilized in the measurements are: d=10 mm and SIR=−18.5 dB, when 42 mW of regulated power was delivered to a resistive load. The Rx-Data 124 and Rx-Clk 126 were measured through an isolator that was supplied at 2.5 V. d=10 mm, $t_d$=28 ns, $t_{pw}$=5 ns, PA_$V_{DD}$=4 V, $V_{REC}$=2.5 V, $V_{dd}$=1.8 V, $V_{ref}$=0.9 V, $t_R$=4 ns, and SIR=−18.5 dB.

FIGS. 13A, 13B, 14A, 14B, and 15 show measured bit error rate (BER) of the wireless link prototype as measured by arranging the coils in parallel alignment using Plexiglas sheets. The surface-to-surface distance, d, between the two PCBs, each of which had 1.5 mm thickness, was 10 mm. Thus, the coupling distances for the data and power links were 10 mm and 13 mm, respectively. A pair of Tektronix GB 1400 (GigaBERT) were used to generate the random serial data bit stream and synchronized clock (for example, the Tx-Data 112 and Tx-Clk in FIG. 1) and measure the wireless link BER of the recovered data, Rx-Data 124, in real time.

In order to test the link in a truly wireless setup and avoid any ground loops, a dual channel voltage isolator (Si8620, Silicon Labs, TX), was utilized and externally supplied 2.5 V on the Rx 110 side to deliver Rx-Data 124 and Rx-Clk 126 to the GigaBERT for BER measurements. The PDM Rx 110 was inductively powered through the on-chip power management block, which generated the regulated $V_{DD}$ for the rest of the chip. Hence, the Rx 110 PDM chip was completely isolated from the Tx 108 chip. To avoid probing the inductive link directly in observing the effects of PDM on the Rx signal, a discrete custom RF amplifier was utilized, in addition to the PDM receiver.

In order to achieve the high data rate (DR) of 13.56 Mbps, the data oscillation at VR 105 (i.e., across the $L_4C_4$-tank) initiated by each Tx pulse was suppressed within $T_p/2$=36.8 ns. With a large quality factor ($Q_4$) of the $L_4C_4$-tank, the data oscillations may have a slow decaying pattern and multiple cycles may be dedicated during $T_p/2$ by tuning $L_4C_4$-tank at $f_d$>>2$f_p$. However, this method makes PDM more sensitive to variations in $t_d$ as will be discussed below. In the experimental measurements, $Q_4$ was reduced to 5 by adding $R_P$=100Ω in parallel with $L_4C_4$-tank (tuned at $f_d$=50 MHz), as shown in FIG. 1, to limit the number of data oscillations and avoid intersymbol interference (ISI).

Figure 13A:
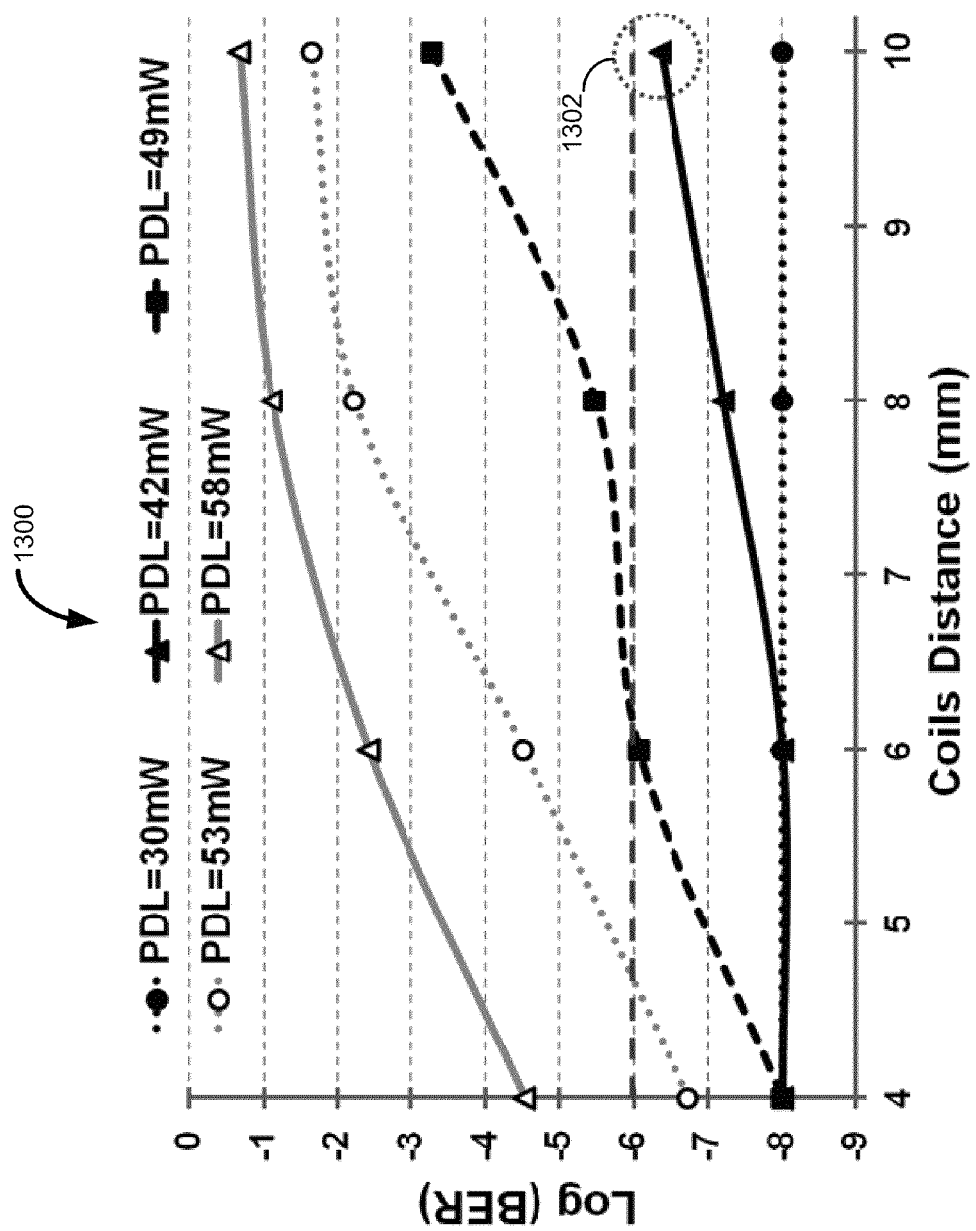
FIG. 13A shows measured bit error rate (BER) at 13.56 Mbps vs. coupling distance, d, for different amounts of power delivered to the load (PDL).

FIG. 13A shows the measured BER 1300 at 13.56 Mbps for various amounts of power delivered to the load (PDL), while changing the coil distance d from 4 to 10 mm. These results indicate that if the acceptable BER limit is considered $10^{-6}$, the PDM transceiver disclosed herein can achieve a data rate (DR) of 13.56 Mbps while delivering 42 mW at d=10 mm, as shown by the encircled data point 1302 in FIG. 13A. According to an example implementation of the disclosed technology, as more power is delivered to the load, the errors may increase because the interference amplitude increases and the small pulses may have less effect on the zero-cross shifting and the detection of the shift may be more difficult.

Figure 13B:
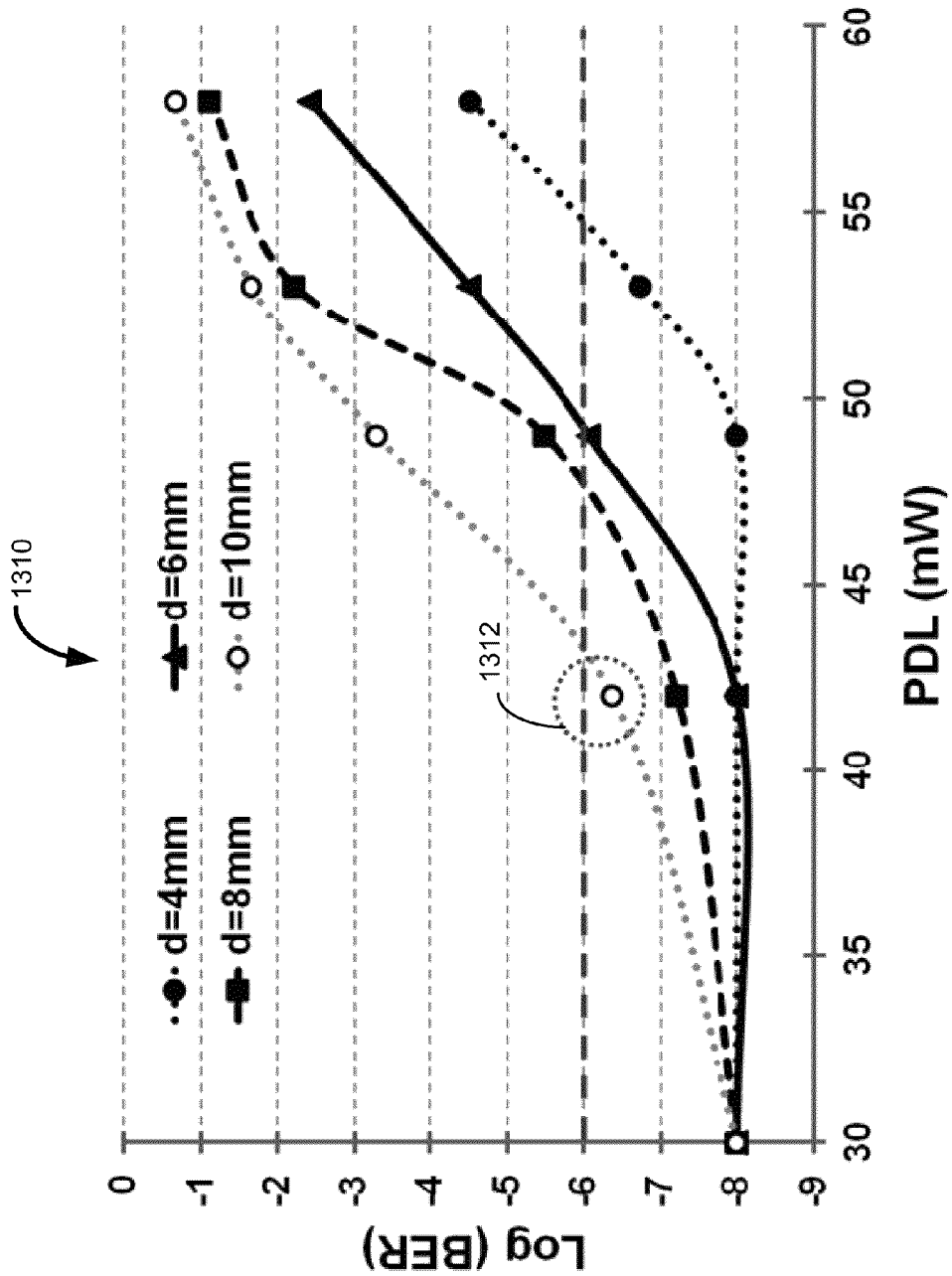
FIG. 13B shows measured BER vs. PDL for different values of d.

FIG. 13B shows similar results as in FIG. 13A, but as a function of power delivered to the load (PDL). As shown, as PDL increases, the error increases. In accordance with an example implementation of the disclosed technology, $10^{-6}$ may be an acceptable BER and approximately 10 mm is nominal distance for implantable devices. Thus, the encircled data point 1312 in FIG. 13B indicates that approximately 42 mW of power can be delivered to the load while achieving acceptable BER at a distance of d=10 mm. FIG. 13B shows measured BER values vs. PDL for different d. At d=10 mm, for PDL>42 mW, the SIR decreases and leads to higher BER. In these measurements, the data Tx and Rx supply voltages were constant at 1.8 V while the PA_$V_{DD}$ was swept between 3.3 V and 5 V to achieve different PDL values. The PDM data Tx and Rx power consumptions were 960 pJ/bit and 162 pJ/bit, respectively. Specifications of the prototype PDM transceiver ASIC are summarized in Table II.

TABLE II

| PDM-Transceiver Specifications | |
|---|---|
| Technology (TSMC) | 0.35-μm 2P4M CMOS |
| Data transceiver supply voltage, $V_{dd}$ | 1.8 V |
| Class-D PA supply voltage, PA_$V_{DD}$ | 1.8-5 V |
| Power carrier frequency, $f_p$ | 13.56 MHz |
| Data rate, DR | 13.56 Mbps |
| Pulse specs: $t_d/t_{pw}$ | 28 ns/5 ns |
| Bit-error-rate (BER) | 4.3 × $10^{-7}$ |

TABLE II-continued

PDM-Transceiver Specifications

| | | |
|---|---|---|
| Technology (TSMC) | | 0.35-μm 2P4M CMOS |
| Nominal coils distance, d | | 10 mm |
| Nominal delivered power to the load | | 42 mW |
| Power consumption (Data) | Tx | 960 pJ/bit |
| | Rx | 162 pJ/bit |
| Area on chip (Power and Data) | Tx | 0.88 mm² |
| | Rx | 0.72 mm |

Figure 14A:
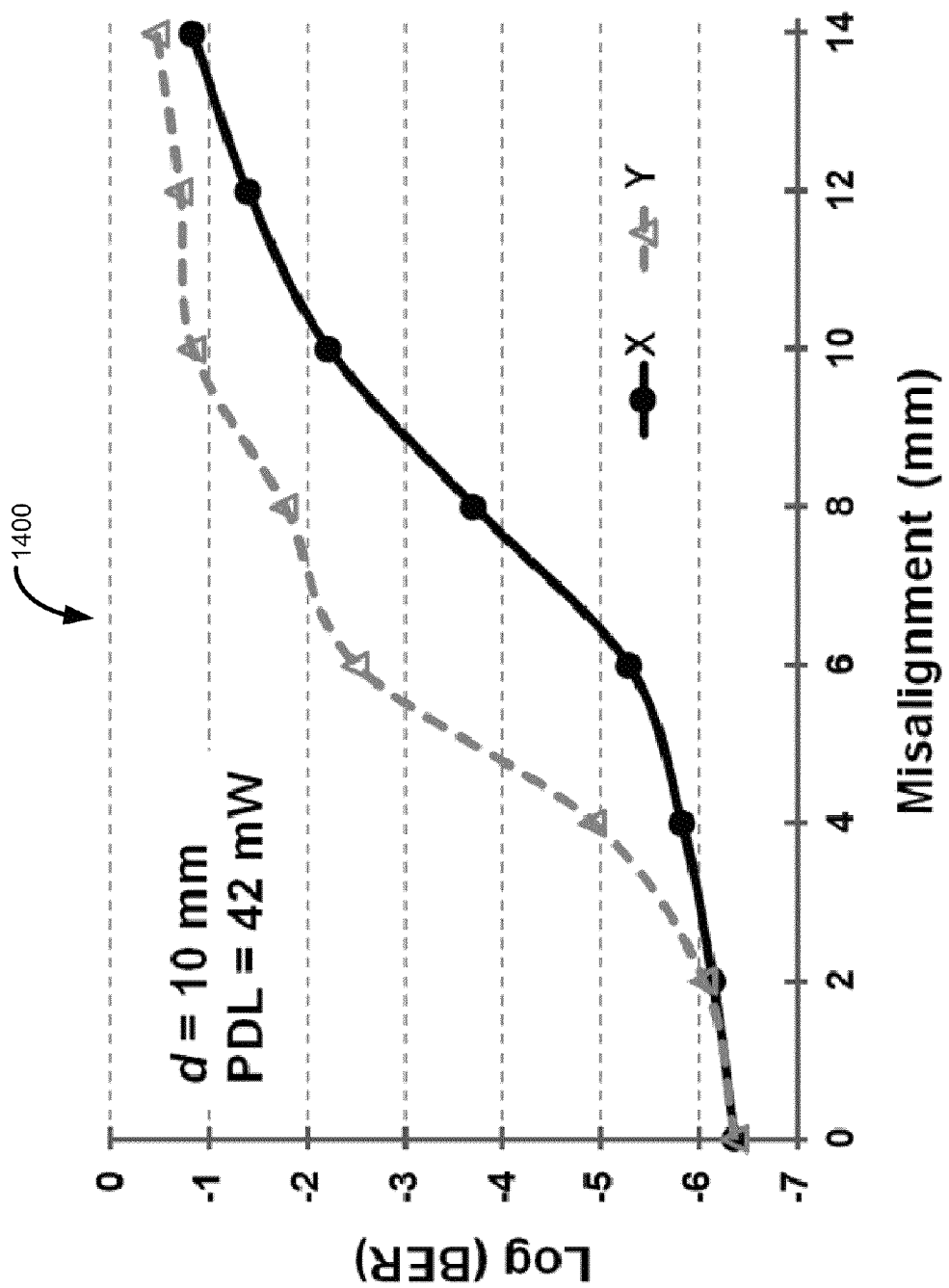
FIG. 14A shows measured BER vs. misalignment along X and Y axes at d=10 mm and DR=13.56 Mbps while 42 mW was delivered to the Rx via $L_1$-$L_2$ link.

FIG. 14A is a graph 1400 that shows the measured changes in the BER due to coil misalignments along the X- and Y-axes at d=10 mm and PDL=42 mW. These curves show that figure-8 coils are more robust against misalignments along the X-axis (lower BER at the same misalignment) compared to the Y-axis, which is in agreement with observations based on variations in the coils' coupling.

Figure 14B:
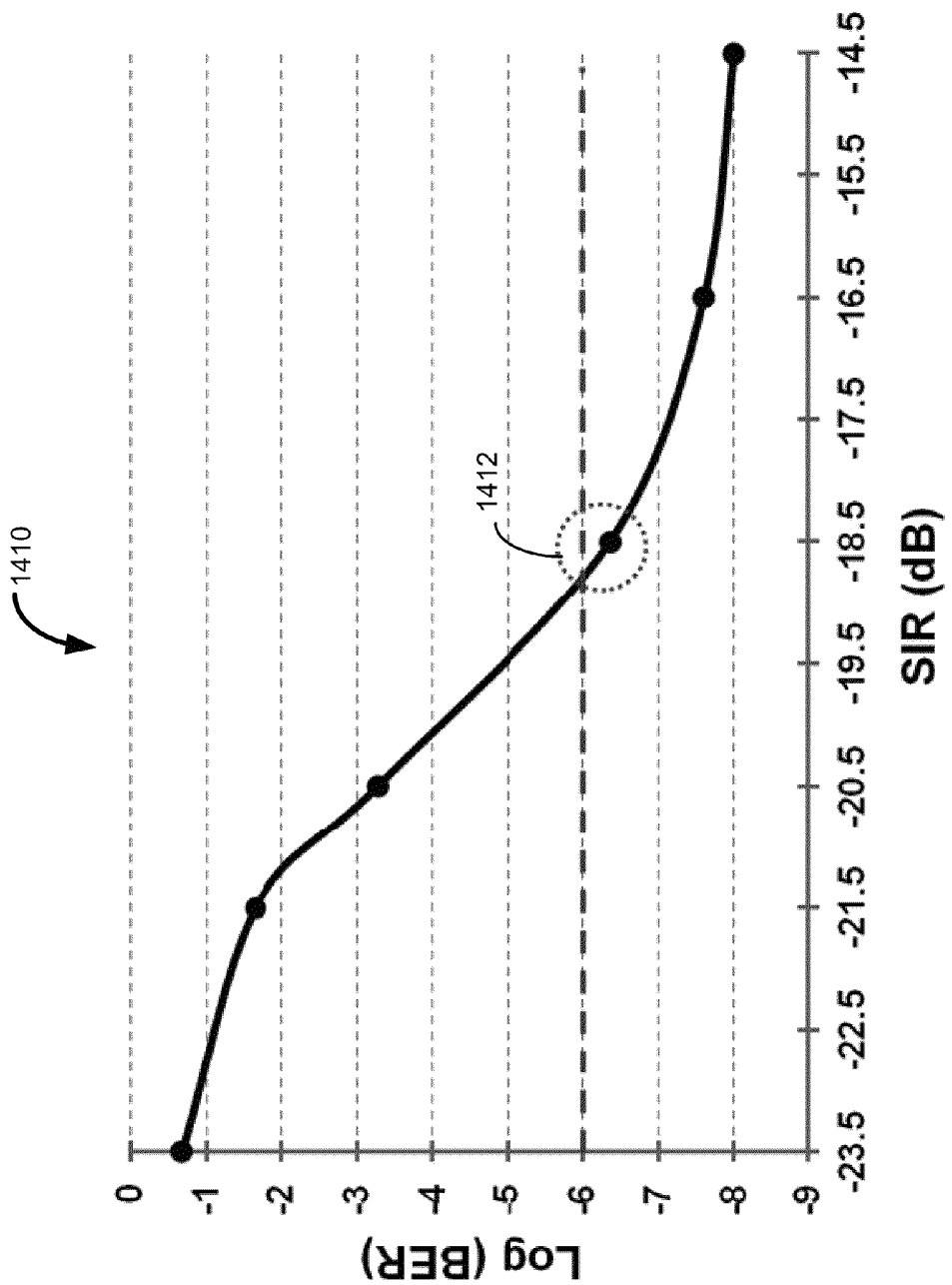
FIG. 14B shows measured BER vs. SIR across the $L_4C_4$-tank.

FIG. 14B is a graph 1410 that shows the measured BER vs. the signal-to-interference ratio (SIR) across the $L_4C_4$-tank (for example, at $V_R$ 105 in FIG. 1), indicating that for an acceptable BER of $10^{-6}$, the minimum required SIR for this PDM receiver is about −18.5 dB, as shown by the encircled data point 1412. At lower SIR, data oscillations across $L_4C_4$-tank may have less effect on shifting the zero-crossings of the power carrier interference, leading to smaller variations on the integrator output (for example, as shown in FIG. 6) for the data bit "1" and higher BER.

Table III benchmarks PDM against recent methods for simultaneous power and data transmission. In terms of technical effects, the experimental prototype PDM transceiver disclosed herein can achieve a data rate of 13.56 Mbps with a BER of $4.3 \times 10^{-7}$ across a 10 mm inductive link, which is the first pulse-based technique for simultaneous power and data transmission at such high data rates. Data Tx and Rx power consumptions under these conditions are only 960 and 162 pJ/bit, respectively, while a separate power link delivers 42 mW of regulated power to the load. Compared to the state-of-the-art, embodiments disclosed herein not only increased the data rate by a factor of about 6.7 but also reduced the data Rx power consumption by about 19 fold. In terms of technical effect, this power reduction may be an important factor in inductively powered IMDs, where received regulated power is quite precious.

The LSK data link, as referred to in Table III, achieved 2.8 Mbps with smaller Tx power consumption. However, LSK can only be used for the uplink while PDM can be used for both up and downlink. Moreover, LSK consumes low power for data transfer at the cost of reducing the PDL by up to 50% at high data rates.

Figure 15:
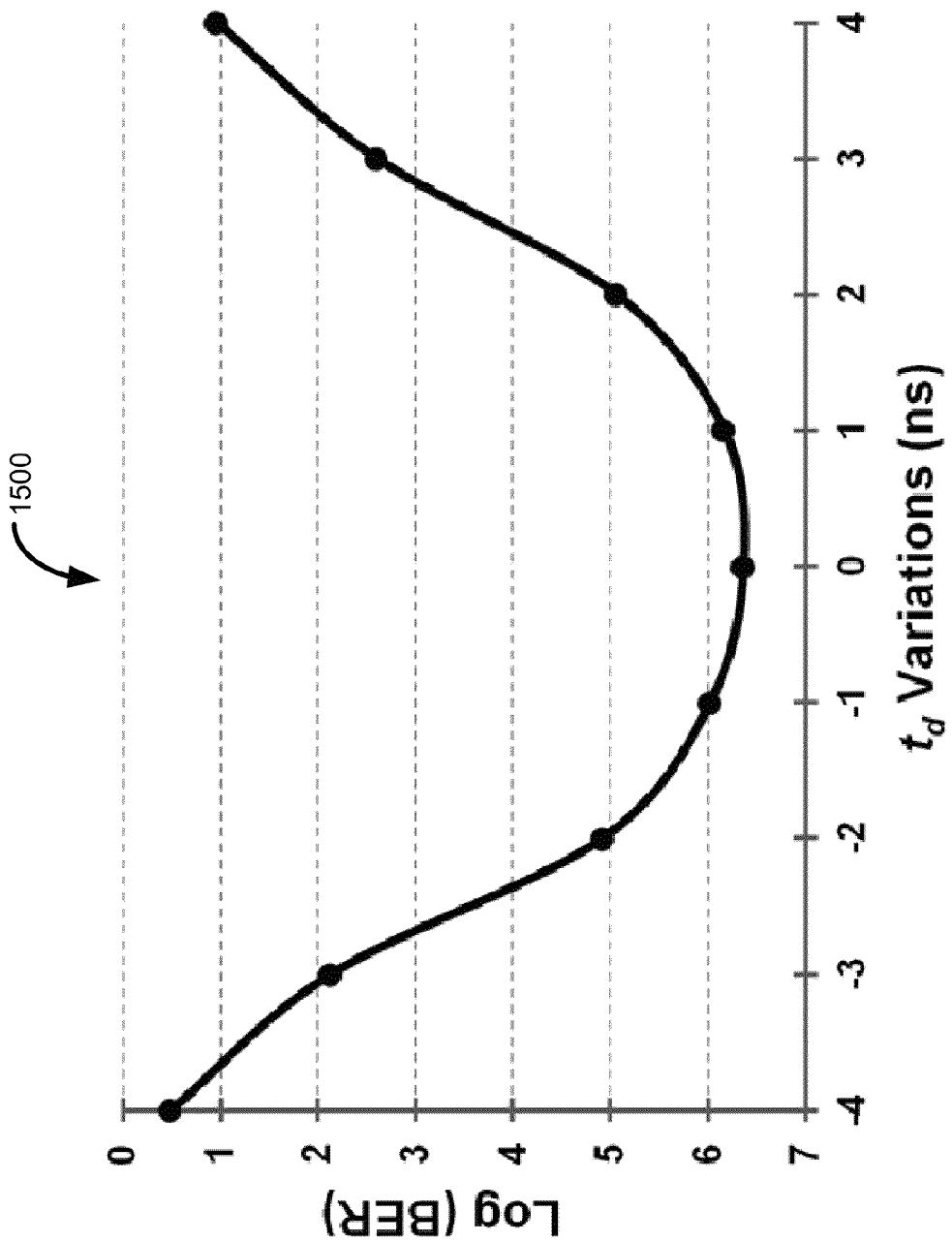
FIG. 15 shows measured BER vs. delay $t_d$ variations for ±4 ns around its optimal value i.e. $t_d$=28 ns at d=10 mm and DR=13.56 Mbps while 42 mW was delivered to the Rx via $L_1$-$L_2$ link.

FIG. 15 shows the measured BER values 1500 when the delay, $t_d$, applied to the data pulses (for example, the data pulses 202 of FIG. 2) is varied up to ±4 ns around its optimal value of $t_d$=28 ns (for example, by controlling the PD signal in FIG. 4A). As indicated $t_d$ variations above 2 ns significantly increased the BER. According to an example implementation of the disclosed technology, and as depicted in FIG. 15, the use of crystal-based oscillators with sub-nanosecond jitter may be utilized in the system to generate the clock. In certain systems with high jitter oscillators, the PDL may be reduced to increase the SIR and maintain a low BER (see FIGS. 13B and 14B). According to certain embodiments, the data Tx block can actively adjust $t_d$ in a closed loop to maintain the BER.

According to an example implementation of the disclosed technology, adjustment of $t_d$ based on the delay between data oscillations and zero-crossing times of the power carrier interference across the $L_4C_4$-tank may be utilized for successful data recovery in the PDM. For example, the jitter in Tx-Clk and any changes in the link impulse response due to coils distance variation or misalignment can vary the optimal $t_d$. However, PDM is fairly robust against such $t_d$ variations because: 1) Variations of the phase delay resulting from the changes in $k_{14}$ (power interference path) and $k_{34}$ (data path), which are the $2^{nd}$ and $3^{rd}$ terms in equation (10), respectively, tend to cancel out each other. In certain embodiments, this will maintain $t_d$ fairly constant considering the fact that $L_1$ and $L_3$ move together. 2) Small variations in $t_d$ slightly shift the voltage peak of the data oscillations (for example, the data oscillations 212 in FIG. 2) that could result in SIR reduction across the $L_4C_4$-tank. It can be shown that if $t_d$ varies by $\Delta t_d$, SIR decreases by $20 \log_{10} (1/\cos \omega_d \Delta t_d)$. This implies that SIR only decreases by 3 dB if $\Delta t_d = \frac{1}{8} f_d = 2.5$ ns. Fortunately, the jitter in crystal-based oscillators is much smaller than 2.5 ns.

According to an example implementation of the disclosed technology, an automatic gain control (AGC) may be utilized to compensate for conditions of fading and distance variation (such as in IMDs) to avoid voltage saturation at small d or weak signals at large d. Although the PDM transceiver disclosed herein does not require AGC, because $V_R$ is amplified to create a square waveform, a similar mechanism can adaptively adjust $t_R$ (for example, as shown in FIG. 6). Similar to $t_d$, changes in the coils' coupling can vary $t_R$ and result in variations in $V_{INT}$. In this condition, $t_R$ values that are too small or too large can result in Rx-Data 124 to be continuously "0" or "1", respectively. Certain example embodiments of the disclosed technology include a local feedback mechanism that monitors a certain parameter in the Rx-Data 124, (e.g. cyclic redundancy checking (CRC)) to compensate for

TABLE III

Benchmarking

| Mod. Scheme | Comm. Link | # of Coils | Distance (mm) | Power Data Carrier Freq. (MHz) | Carrier Freq. (MHz) | Data Rate (Mbps) | Tx/Rx Power (pJ/bit) | CMOS Tech. (μm) | SIR (dB) | Die Area (mm³) (Data Tx/Rx) | Supply Vol. (V) | BER |
|---|---|---|---|---|---|---|---|---|---|---|---|---|
| pcFSK | Down | 2 | 5 | 5/10 | 5/10 | 2.5 | —/152 | 1.5 | — | —/0.29 | 5 | $10^{-5}$ |
| BPSK | Down | 4 | 15 | 10 | 10 | 1.12 | —/625 | 0.18 | — | —/0.2 | 1.8 | $10^{-5}$ |
| LSK⁺ | Up | 2 | 20 | 25 | 25 | 2.8 | 35.7/1250 | 0.5 | — | 2.2/2.2** | 2.8 | $10^{-6}$ |
| FSK | Down | 4 | 20 | —/5 | 5 | 1.25 | — | 0.8 | — | — | 2.7 | — |
| BPSK | Up | 4 | 20 | 48 | 5 | 3 | 1962/— | 0.8 | — | 2.3** | 2.7 | $2 \times 10^{-4}$ |
| QPSK | Down | 4 | 5 | 13.56 | 1 | 4.16 | — | — | — | — | — | $2 \times 10^{-6}$ |
| BPSK | Down | 4 | 10~15 | 20 | 2 | 2 | —/3100 | 0.35 | −12* | —/4.4 | 4.5 | $10^{-7}$ |
| DPSK | Down | 4 | — | 20 | 2 | 2 | — | 0.18 | — | — | 1.8 | $10^{-7}$ |
| PDM | Down | 4 | 10 | 50 | 13.56 | 13.56 | 960/162 | 0.35 | −18.5 | 0.34/0.37 | 1.8 | $4.3 \times 10^{-7}$ |

$t_R$ variations. According to an example implementation of the disclosed technology, dynamic control of the input to the delay block in (as shown in FIG. 6) may be utilized to compensate for $t_R$ variations.

Figure 16:
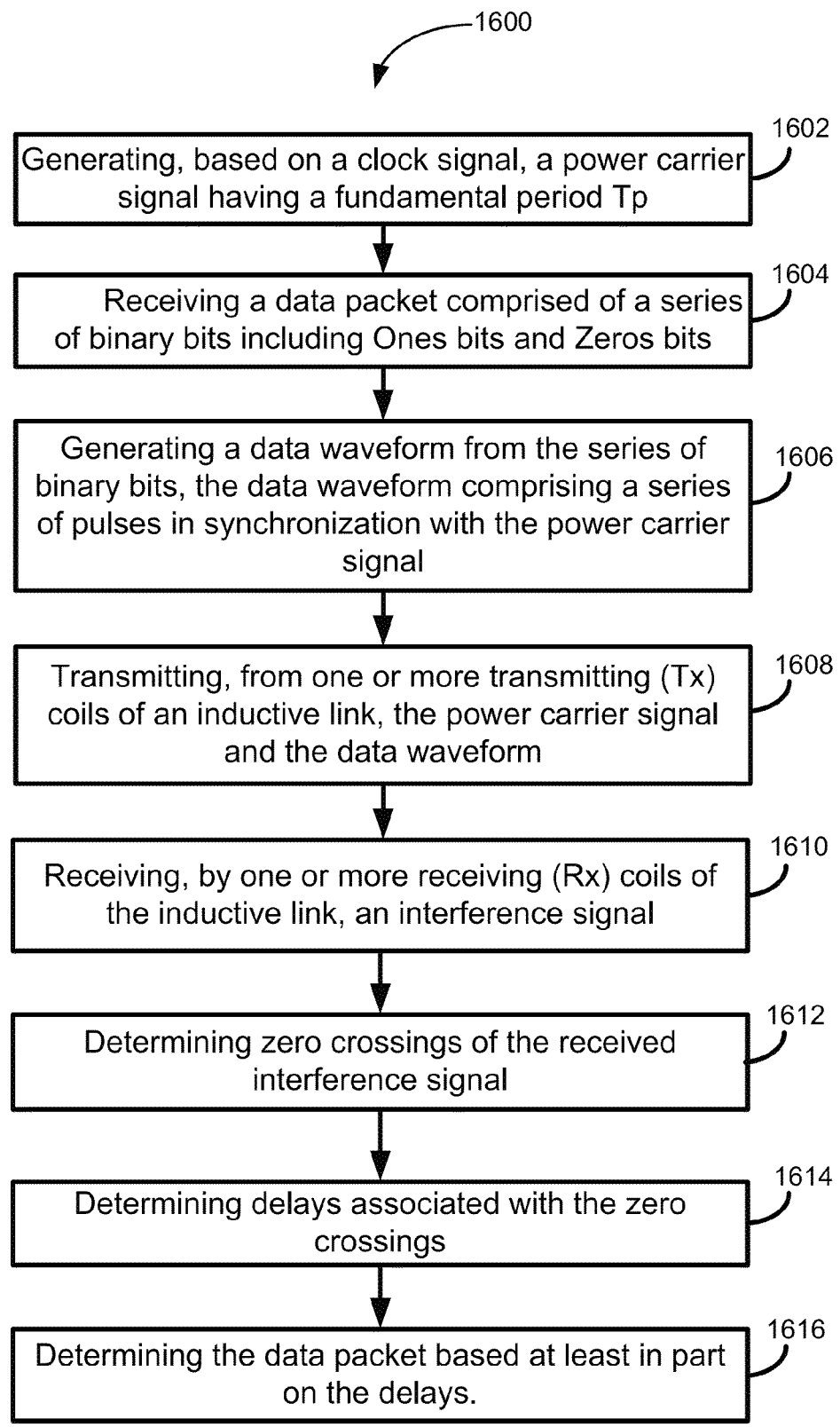
FIG. 16 is a flowchart of a method, according to an example implementation of the disclosed technology.

An example method 1600 for wirelessly transmitting data and power across inductive links using pulse delay modulation (PDM) will now be described with reference to the flowchart of FIG. 16. The method 1600 starts in block 1602, and according to an example implementation includes generating, based on a clock signal, a power carrier signal having a fundamental period $T_p$. In block 1604, the method 1600 includes receiving a data packet comprised of a series of binary bits including Ones bits and Zeros bits. In block 1606, the method 1600 includes generating a data waveform from the series of binary bits, the data waveform comprising a series of pulses in synchronization with the power carrier signal, the series of pulses comprising at least one pulse for each of the Ones bits or for each of the Zeros bits. In block 1608, the method 1600 includes transmitting, from one or more transmitting (Tx) coils of an inductive link, the power carrier signal and the data waveform. In block 1610, the method 1600 includes receiving, by one or more receiving (Rx) coils of the inductive link, an interference signal, the interference signal based at least in part on a superposition of the transmitted power carrier signal and the transmitted data waveform. In block 1612, the method 1600 includes determining zero crossings of the received interference signal. In block 1614, the method 1600 includes determining delays associated with the zero crossings. In block 1616, the method 1600 includes determining the data packet based at least in part on the delays.

According to an example implementation of the disclosed technology, each of the pulses of the data waveform may include a rectangular shape or a Gaussian shape having a duration of greater than about 0.5 picoseconds and less than about $T_p/2$. Certain example implementations may include receiving, by one or more receiving (Rx) coils, the transmitted power carrier signal and regenerating the clock signal based on the received power carrier signal or the interference signal. In certain example implementations, the delays associated with the zero crossings are determined with respect to the regenerated clock signal.

In certain example implementations, each of the Ones bits comprise at least one pulse and wherein each of the Zeros bits comprise no pulse. In certain example implementations, each of the Ones bits comprise at least one positive pulse and wherein each of the Zeros bits comprise at least one negative pulse. In certain example implementations, each of the Ones bits comprise a pair of pulses of opposite polarity and spaced by $T_p/2$.

According to an example implementation of the disclosed technology, the data waveform includes the series of pulses in phase synchronization with the power carrier signal. In certain example implementations, the inductive link includes a plurality of coils configured to be coupled, the plurality of coils including a power Tx coil, a power Rx coil, a data Tx coil and a data Rx coil, wherein the power Tx coil is configured to be inductively coupled with the data Rx coil in part due to proximity.

Certain technical effects may be realized by embodiments of the disclosed technology. For example, embodiments disclosed herein may be utilized to implement an ASIC-based, low-power PDM-based transceiver using a standard CMOS process. Additional technical effects of the disclosed technology may enable low-power, wideband, and robust telemetry along with power transmission, for use in advanced inductively-powered implantable medical devices. Additional technical effects may include lower power consumption.

In the description presented herein, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," "certain implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In some instances, a computing device may utilized in conjunction with the systems disclosed herein. The computing device may be a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a processor combined with one or more additional hardware components.

The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

In certain example implementations, the computing device (CPU) may be coupled, connected, and/or in communication with one or more peripheral devices, such as display, Wi-Fi access point, etc. In an example embodiment, the computing device may output content or data to a display.

Furthermore, the various aspects described herein may be implemented using standard programming or engineering techniques to produce software, firmware, hardware, or any combination thereof to control a computing device to implement the disclosed subject matter.

Various implementations of the communication systems and methods herein may be embodied in non-transitory computer readable media for execution by a processor. An example implementation may be used in an application of a computing device, such as portable computers, tablet PCs, Internet tablets, PDAs, ultra mobile PCs (UMPCs), etc.

Example implementations of the disclosed technology may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of wirelessly transmitting data and power across inductive links using pulse delay modulation (PDM), the method comprising:
   generating, based on a clock signal, a power carrier signal having a fundamental period $T_p$;
   receiving a data packet comprised of a series of binary bits including Ones bits and Zeros bits;
   generating a data waveform from the series of binary bits, the data waveform comprising a series of pulses in synchronization with the power carrier signal, the series of pulses comprising at least one pulse for each of the Ones bits or for each of the Zeros bits;
   transmitting, from one or more transmitting (Tx) coils of an inductive link, the power carrier signal and the data waveform;
   receiving, by one or more receiving (Rx) coils of the inductive link, an interference signal, the interference signal based at least in part on a superposition of the transmitted power carrier signal and the transmitted data waveform;
   determining zero crossings of the received interference signal;
   determining delays associated with the zero crossings; and
   determining the data packet based at least in part on the delays.

2. The method of claim 1, wherein each of the pulses of the data waveform comprise a rectangular shape or a Gaussian shape having a duration of greater than about 0.5 picoseconds and less than about $T_p/2$.

3. The method of claim 1, further comprising receiving, by one or more Rx coils, the transmitted power carrier signal and regenerating the clock signal based on the received power carrier signal or the interference signal.

4. The method of claim 3, wherein the delays associated with the zero crossings are determined with respect to the regenerated clock signal.

5. The method of claim 1, wherein each of the Ones bits comprise at least one pulse and wherein each of the Zeros bits comprise no pulse.

6. The method of claim 1, wherein each of the Ones bits comprise at least one positive pulse and wherein each of the Zeros bits comprise at least one negative pulse.

7. The method of claim 5, wherein each of the Ones bits comprise a pair of pulses of opposite polarity and spaced by $T_p/2$.

8. The method of claim 1, wherein the data waveform comprises the series of pulses in phase synchronization with the power carrier signal.

9. The method of claim 1, wherein the inductive link comprises a plurality of coils configured to be coupled, the plurality of coils including a power Tx coil, a power Rx coil, a data Tx coil and a data Rx coil, wherein the power Tx coil is configured to be inductively coupled with the data Rx coil in part due to proximity.

10. A system comprising:
   plurality of coupled coils including:
      a power transmission (Tx) coil;
      a power receiver (Rx) coil, a data Tx coil; and
      a data Rx coil;
      wherein the power Tx coil is inductively coupled with the data Rx coil in part due to proximity;
   a data pulse pattern generator configured to drive the data Tx coil;
   a power carrier signal generator configured to drive the power Tx coil;
   a power receiver and clock recovery circuit operatively coupled to the power Rx coil;
   a pulse delay detector operatively coupled to the data Rx coil; and
   circuitry configured to:
      generate, by the power carrier signal generator and based on a clock signal, a power carrier signal having a fundamental period $T_p$;
      receive, at the data pulse pattern generator, a data packet comprising a series of binary bits including Ones bits and Zeros bits;
      generate, by the data pulse pattern generator, a data waveform from the series of binary bits, the data waveform comprising a series of pulses in synchronization with the power carrier signal, the series of pulses comprising at least one pulse for each of the Ones bits or for each of the Zeros bits;
      transmit, from the power Tx coil, the power carrier signal;
      transmit, from the data Tx coil, the data waveform;
      receive, by the data Rx coil, an interference signal, the interference signal based at least in part on a superposition of the transmitted power carrier signal and the transmitted data waveform;

determine, by the pulse delay detector, zero crossings of the received interference signal;
determine delays associated with the zero crossings; and
determine the data packet based at least in part on the delays.

11. The system of claim 10, wherein the data pulse pattern generator is configured to generate each of the pulses of the data waveform with a rectangular shape or a Gaussian shape having a duration of greater than about 0.5picoseconds and less than about $T_p/2$.

12. The system of claim 10, wherein the circuitry is further configured to receive, at the power Rx coil, the transmitted power carrier signal, and wherein the circuitry is further configured to regenerate the clock signal based on the received power carrier signal.

13. The system of claim 10, wherein the circuitry is further configured to receive, at the data Rx coil, the interference signal, and wherein the circuitry is further configured to regenerate the clock signal based on the interference signal.

14. The system of claim 13, wherein the delays associated with the zero crossings are determined with respect to the regenerated clock signal.

15. The system of claim 10, wherein the data pulse pattern generator is configured to generate each of the Ones bits with at least one pulse and each of the Zeros bits with no pulse.

16. The system of claim 10, wherein the data pulse pattern generator is configured to generate each of the Ones bits with at least one positive pulse and each Zeros bits with at least one negative pulse.

17. The system of claim 10, wherein the data pulse pattern generator is configured to generate each of the Ones bits with a pair of pulses of opposite polarity and spaced by $T_p/2$.

18. The system of claim 10, wherein the data pulse pattern generator is configured to generate the series of pulses in phase synchronization with the power carrier signal.

19. The system of claim 10, wherein the circuitry is further configured to generate, by the data pulse pattern generator, a data waveform from the series of binary bits, the data waveform comprising a series of pulses in synchronization with the power carrier signal, the series of pulses comprising at least one pulse for each of the Ones bits and for each of the Zeros bits, wherein the pulses for the Ones bits and the Zeros bits are of opposite polarities.

20. A transmitter apparatus comprising:
a data transmission (Tx) coil configured for inductively coupling with a data receiver (Rx) coil;
a power Tx coil inductively coupling with the data Rx coil due to their proximity with one another;
a data pulse pattern generator configured to drive the data Tx coil;
a power carrier signal generator configured to drive the power Tx coil;
circuitry configured to:
generate, by the power carrier signal generator and based on a clock signal, a power carrier signal having a fundamental period $T_p$;
receive, at the data pulse pattern generator, a data packet comprising a series of binary bits including Ones bits and Zeros bits;
generate, by the data pulse pattern generator, a data waveform from the series of binary bits, the data waveform comprising a series of pulses in synchronization with the power carrier signal, the series of pulses comprising at least one pulse for each of the Ones bits or for each of the Zeros bits, or the series of pulses comprising at least one pulse for each of the Ones bits and for each of the Zeros bits, wherein the pulses for the Ones bits and the Zeros bits are of opposite polarities;
transmit, from the power Tx coil, the power carrier signal;
transmit, from the data Tx coil, the data waveform;
wherein the transmitted power carrier signal and the transmitted data waveform are configured to superimpose to produce an interference signal, the interference signal configured to be received at a receiver for determining zero crossing delays of the interference signal, and for determining the data packet based at least in part on the zero crossing delays.

21. The transmitter apparatus of claim 20, wherein the data pulse pattern generator is configured to generate each of the pulses of the data waveform with a rectangular or Gaussian shape having a duration of greater than about 0.5picoseconds and less than about $T_p/2$.

22. The transmitter apparatus of claim 20, wherein the power carrier signal is configured to be received for regenerating the clock signal based on the received power carrier signal and the interference signal.

23. The transmitter apparatus of claim 20, wherein the data pulse pattern generator is configured to generate each of the Ones bits with at least one pulse and each of the Zeros bits with no pulse.

24. The transmitter apparatus of claim 20, wherein the data pulse pattern generator is configured to generate each of the Ones bits with at least one positive pulse and each of the Zeros bits with at least one negative pulse.

25. The transmitter apparatus of claim 20, wherein the data pulse pattern generator is configured to generate each of the Ones bits with a pair of pulses of opposite polarity and spaced by $T_p/2$.

26. The transmitter apparatus of claim 20, wherein the data pulse pattern generator is configured to generate the series of pulses in phase synchronization with the power carrier signal.

27. A receiver apparatus comprising:
a power receiver (Rx) coil configured for inductively coupling with a power transmitter (Tx) coil;
a data Rx coil inductively coupling with the a power Tx coil due to proximity with each other;
a power receiver operatively coupled to the power Rx coil;
a clock recovery circuit operatively coupled to the power Rx coil;
a pulse delay detector operatively coupled to the data Rx coil; and
circuitry configured to:
receive, by the data Rx coil, an interference signal, the interference signal based at least in part on a superposition of a transmitted power carrier signal and a transmitted data waveform;
determine, by the pulse delay detector, zero crossings of the received interference signal;
determine delays associated with the zero crossings;
determine the data packet based at least in part on the delays; and
output the data packet.

28. The receiver apparatus of claim 27, wherein the interference signal is based on a superposition of a data waveform and a power carrier signal having a fundamental period $T_p$, wherein the power carrier signal is based on a clock signal and the data waveform includes a series of pulses representing bits including Ones bits and Zeros bits, the series of pulses including at least one pulse for each of the Ones bits or for each of the Zeros bits, or for both but of opposite polarity, each of the pulses of the data waveform is a rectangular or Gaussian shape having a duration of greater than about 0.5 picoseconds and less than about $T_p/2$.

29. The receiver apparatus of claim 27, wherein the circuitry is further configured to receive, at the power Rx coil, the transmitted power carrier signal, and wherein the circuitry is further configured to regenerate the clock signal based on the received power carrier signal, and wherein determining the zero crossing delays of the received interference signal is further based on the regenerated clock signal.

30. The system of claim 27, wherein the circuitry is further configured to receive, at the data Rx coil, the interference signal, and wherein the circuitry is further configured to regenerate the clock signal based on the interference signal, and wherein determining the zero crossing delays of the received interference signal is further based on the regenerated clock signal.

\* \* \* \* \*